3,330,686
CONTINUOUS POLYMER DEPOSITION PROCESS
Henry J. Rose, Danville, Ill., assignor to Tee-Pak, Inc., Chicago, Ill., a corporation of Illinois
Filed Jan. 27, 1964, Ser. No. 340,353
20 Claims. (Cl. 117—47)

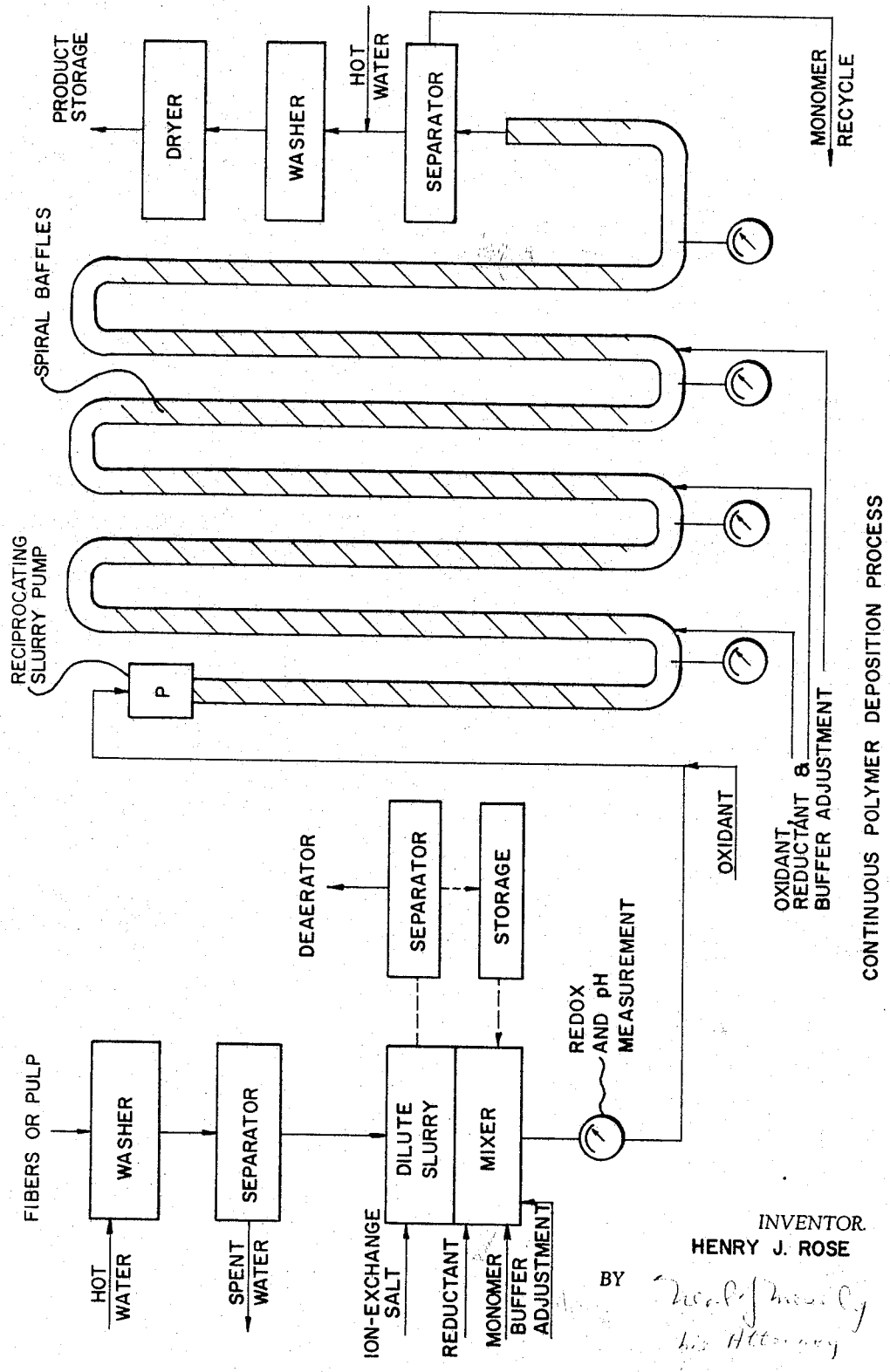

This invention relates to new and useful improvements in processes for the formation and deposition of polymers within and upon other polymeric materials and more particularly to a continuous process of polymer deposition. This invention further relates to novel, composite polymeric materials produced by said process.

This invention is an improvement upon the invention of Douglas J. Bridgeford described in the United States Patent 3,083,118 entitled Method of Depositing a Polymer of Olefinically Unsaturated Monomer Within a Polymeric Material and the Resulting Product. The Bridgeford process was in turn an improvement on processes of the type described by Charlton and Speakman in United States Patents 2,406,412, 2,406,453 and 2,406,454 and by Landells et al. in a paper entitled Preparation and Properties of Regenerated Cellulose Containing Vinyl Polymers, The Journal of The Society of Dyers and Colorists, 67, pp. 338–344.

Efforts have been made in the past to effect changes in the physical and chemical properties of polymeric films, fibers, filaments and other articles by in situ formation and deposition of polymers both on the surface and without the interior regions of such articles. Previous attempts have involved the impregnation of polymeric materials with catalysts or the precipitation of catalysts of polymeric materials followed by treatment of the catalyst-containing materials with monomers to form a polymer within the treated material. Success has not been great, due at least in part to an inability to control satisfactorily the nature and extent of the polymer deposition on or in the article being treated.

In the Bridgeford process, it became possible for the first time to restrict the deposition of a polymer substantially to a desired portion of the interior and/or surface of the polymeric film, individual fiber or filament, or article of any shape or form, so long as the material being treated possessed ion exchange capacity. In the Bridgeford process, a polymeric host material of at least gelatinous solidity and having ion exchange capacity is treated with an ionic material forming at least part of a polymerization catalyst to chemically fix the catalyst in the host by ion exchange reaction with the ion exchange groups in the host material. The treated host material containing the combined catalyst is then treated in any order with an olefinically unsaturated monomer and anything additional required to render the chemically fixed material catalytically active. As a result, the guest monomer is polymerized and deposited only in the preselected region of the host material in which the catalyst is chemically fixed.

The Bridgeford process is applicable to the polymerization of any olefinically unsaturated monomer and deposition of the resulting polymer into any polymeric host material possessing ion exchange capacity. The Bridgeford patent describes a large number of monomers, host materials, and catalyst systems which can be utilized in the deposition of polymers and sets forth a general theory and explanation of the scope of that process.

Discussion of prior art and summary of the invention

This invention is concerned with an improvement of the Bridgeford polymer deposition process in adapting that process for continuous and controllable operation. In carrying out the continuous polymer deposition using the process described in the Bridgeford patent, it is necessary that satisfactory controls be provided for continuous monitoring of the reaction system to insure that the reaction conditions are maintained continuously at levels producing an efficient deposition of polymers. In changing from batch to continuous operation, it is necessary to set up check points throughout the operation and to know what controls are necessary and what changes in reaction conditions, feed rates, etc., are to be made at the proper stage in the process in order to insure that the process will run smoothly and uniformly.

In a preferred form of the Bridgeford polymer deposition process, a reducing metal, such as ferrous ion, is ion exchanged into a host material such as cellulose. The catalyst-containing host material is then treated with an aqueous solution containing an olefinically unsaturated monomer, e.g. acrylonitrile, methyl methacrylate, styrene, etc., and hydrogen peroxide, which results in the deposition of polymer within the host. When this process is applied to the deposition of polymer into cellulosic fibers, e.g. cotton, wood pulp, etc., a number of problems are encountered. At times there are enough reducing materials, either iron, manganese, or sugar, in cellulose fibers to make the addition of a reducing ion unnecessary, or there will be a reducing complex set up with the cellulose which will be part of a redox catalyst system designed to give polymer deposition on the cellulose fibers in the vicinity of the chemically bound catalyst.

There are several objections to this basic process from the view point of a continuous operation. First, in order to get uniform distribution within a reasonable time, it is necessary to use an excess of the reducing metal, for example the ferrous ion. This excess must be removed by very careful washing. Both requirements, i.e., the uniform ion exchange and removal of excess ions, take considerable time and care. Most cellulose fibers are mixed with foreign materials such as waxes, polysaccharides, or lignins which interfere with the uniform distribution of the initial ion-exchanged metal. Another, and still more serious objection, is the presence of entrained air in pulp or other cellulosic fibers, which obviously must be removed to avoid oxidizing the reducing ion before it is put to its required use as a catalyst component.

For continuous polymer deposition, it is necessary to operate with a minimum of the reducing metal ion. To make the initial ion exchange treatment of the polymeric host material insensitive to the presence of air, it is desirable to avoid the use of a metal ion in its reduced valence state. It would be desirable to use metals that would be stable and would maintain their position in the host material after ion exchange even when temperature and pH are changed radically. Polyvalent metals in general, and metals of group 1B of the periodic table can be used for this purpose, although it is preferred to use metals which normally have only a single valence state.

In this process, the metal, not necessarily in its reduced state, is deposited in the polymeric host material by ion exchange reaction and a catalyst component is bound to the combined metal by coordination bonding. The metal ion which is bound to the host material by ion exchange and the catalyst component which is initially added to the host material are selected from known materials which form complexes. The catalyst which is used may be a reducing or an oxidizing material or other catalyst which can complex with the metal ion bound to the host material by ion exchange reaction.

This process is best described by reference to the continuous treatment of fibrous cellulosic materials such as cotton or wood fibers. Ion exchange with the chosen metal salt is carried out using fibers which have been washed and formed into a slurry. The ion exchange is carried out by addition of a calculated amount of the metal salt required to exchange with the available carboxyl groups in the fibers. The ion exchange treatment of the host materials is followed by warming under agitation to remove entrained air and then a catalyst material is added to coordinate with the ion-exchange salt. The cordination of the catalyst with the ion-exchange salt will be described more fully below. The use of catalyst materials which will complex with the ion-exchange salt permits a wider range of control of addition of the catalyst to the reaction system to regulate the deposition of polymer and thus predetermine the amount and location of deposited polymer in the host material.

Next, an olefinically unsaturated monomer is added to the slurry of catalyst-containing host material. The monomer is preferably added in its commercially available form containing a small amount, e.g. 20–30 p.p.m., of inhibitor to retard or prevent polymerization in the liquid phase. The monomer is preferably added together with the remaining component of the catalyst system so that the chemically bound catalyst component and the remaining catalyst component interact to initiate polymerization only in the immediate vicinity of the sites at which the catalyst is bound to the host material. Since the preferred form of this invention utilizes a redox catalyst system, the chemically bound catalyst is either the reducing or oxidizing component and the other catalyst component is that required to initiate and maintain polymer growth.

In carrying out this process, controls are set up to measure and maintain a specified reducing or oxidizing potential and pH. Continuous electrical measurements are made of the reducing or oxidizing potential and the strength of the reducing or oxidizing solution added initially to the ion exchanged host material is adjusted to a predetermined constant value. If the solution is too weak or if the reducing or oxidizing potential is too great due to presence of reducing or oxidizing impurities or if the remaining catalyst component added with the monomer is not of standard strength, suitable correction is made to provide a reducing or oxidizing potential and pH of predetermined constant level. Redox potential is measured and controlled at the point of addition of the second catalyst component, e.g. hydrogen peroxide or equivalent, and the temperature of the slurry is gradually increased until reflux temperature is reached. The slurry is held under reflux for a specified time and for calculated exhaustion of the catalyst system. After cooling and separation of the bulk water, the polymer-modified host material is then washed and dried.

This process is characterized by greater uniformity of product, better control of process conditions, and ability to operate under a wide variety of process conditions including variations in pH and redox potential and use of more dilute $H_2O_2$ than is possible in prior and polymerization processes.

Host materials

While the process of this invention is intended primarily for use with fibrous or particulate host materials in the form of a slurry, the process can be used with any polymeric host material having ion exchange capacity. The aspects of the process which deal with continuous processing are obviously applicable only to host materials having a form suitable for continuous processing. However, the improved process using a catalyst which is complexed to an ion introduced into the host material by ion exchange reaction is useful in depositing polymers into any polymeric host material regardless of its form. The polymeric starting material to be treated generally should process at least gelatinous solidity. Thus, the polymeric starting material may be solid (such as dry cotton fiber or wood pulp); may be a gel (such as gelatin or agar agar); or may be composite (including the solid and gel phase such as viscose rayon fiber).

Among the polymer materials which can be treated in accordance with this invention, so long as they possess ion exchange capacity, are the following:

Cellulose, in pure form and combined with impurities, such as cotton, cotton linters, wood, wood fibers, wood pulp, wood powder, wood flour, ramie, hemp, sisal, linen, jute, cocoanut shell flour, cottonseed hulls, walnut sheet flower, and the like; as well as hemicellulose, brown algae, alginic acids, kenaf, bagasse, new and used paper and paper products, bacterial cellulose, peat, lignite, tunicin, and the like; various forms of regenerated cellulose, and absestos, gelatin, carbon black having carboxyl or other ion exchange groups, and the like. Peanut shells, straw, bamboo fibers, and other materials may also be used.

Others are lichenin, lignin and lignocelluloses, and derivatives thereof in which the ion exchange capacity has not been destroyed.

Additional materials are represented by cellulose derivatives in which the ion exchange capacity is not removed. These include inorganic esters like nitrocellulose, cellulose sulfate, phosphate, and the like. Organic esters like the acetate formate, acetate butyrate, acetate propionate, and other fatty acid esters may be used. Unsaturated, halogenated, aromatic and other types of esters may also be used. These include the cellulose crotonate, methacrylate-acetate, and the like, as well as hydroxyl, keto, and amino esters. Cellulose benzoate, phenylacetate, and the like may also be used.

Other polymeric starting materials useful with the method of this invention are condensation polymers which contain an ion exchange group or which can be made to contain one by hydrolysis or saponification and include nylons, polyesters, phenolaldehyde, melamine-aldehyde, and urea-aldehyde and the like, and condensation polymers containing ion exchange groups.

Also included are addition type polymers which contain ion exchange groups including sulfonated polystyrenes, vinyl, acryl, methacryl, and allyl ethers, esters, nitriles, amides, acids, acetals, alcohols, alkyl amines, sulfides, sulfones, sulfonates, halides, lactams, lactone, carbamates, imides, ketones, mercaptans, and the like. Copolymers of monomers containing ion exchange groups with those which do not may also be employed.

Examples of casing materials which may be used in the process of the invention include regenerated cellulose from the cuprammonium and viscous processes as well as the nitrate, acetate and other processes; alginates, including divalent metal alginates, ethers, partial esters, metal salt-ester combinations and other derivatives which do not use up all the carboxyl groups; natural animal casings, including specifically sheep gut casing, beef, hog, and other animal casings, fibrous casings; regenerated protein casings, including "Naturin," "Brechtin," "Cutecin," and the like; low methoxy pectin in which some ion exchange groups are available; parchment or other paper casings cemented at the edges; casein and chemically modified insolubilized casein; polyester films in which not all the acid groups have been esterified; amylose casings; and addition type polymers or copolymers containing acid or basic groups which have been previously classified.

Polymer-coated cellulose films can be treated as described in the Bridgeford patent. Thus, cellulose films containing the polymers listed in the next sentence either throughout the film or surface-layer localized and deposited so that the contact angle of the water five seconds after placement is at least 30° will improve adhesion to several important films. Among such polymers are Saran F–120, Saran F–242, styrene, vinylacetate, p-chlorostyrene, 2,5-dichlorostyrene, methylmethacrylate, allylmethacrylate and vinylmethacrylate. Such modified cellulose films will adhere well to coating whose base is polyethylene as well as such other well known materials as Saran F–120, Saran F–242, Pliofilm, Parlon, cellulose nitrate, cellulose acetate, ethyl cellulose, Vinyon N, as well as Bakelite vinyl chloride-acetate resins such as Vinylite VYHH 1, VYDR, VACH and VMCH.

Other materials containing ion exchange groups which may be processed in accordance with the method of this invention are illustrated by the following.

Protein and proteinaceous materials which may be used in the process of this invention include such materials as wool, silk, animal gut casing, skin, leather, gelatin, zein, casein, egg albumin, feathers, peanut protein, regenerated protein, animal hairs, soya, fish protein, and the like.

Protein derivatives may include, for example, acetylated, alkylated, reduced, esterified, cross-linked materials in which some ion exchange groups are left and formylated, chlorinated salts, isocyanate derivatives and the like.

Starch and starch derivatives (i.e., amylaceous materials) useful with the method of this invention include potato and cornstarch, and like materials, starch derivatives similar to those listed for cellulose and particularly those derivatives which can add ion exchange groups in addition to the naturally occurring exchange sites.

Silicone polymers which contain groups capable of ion exchange may be used with the method of this invention.

Rubbers, both synthetic and natural, when they contain groups capable of ion exchange, are also useful with this method. Theses include, for example, butadiene copolymers with acid or basic monomers, chloroprene, copolymers similarly, partially saponified ester rubbers, urethanes, and the like.

In carrying out this invention, and of the aforementioned polymeric host material (or any other polymer material having ion exchange capacity) can be used where polymers are deposited into the host material by first anchoring a metal ion by ion exchange reaction and then forming a complex with the anchored ion of a catalyst material which comprises part of a catalyst system. The catalyst component which is complexed with the ion-exchange host material may be operative as a catalyst per se or may be a component of a multiple component catalyst system such as a reducing or oxidizing component of a redox catalyst system.

Where the aforementioned host materials are treated continuously in accordance with this invention, the starting materials must be of fibrous film, filament or particulate form or otherwise in a form permitting continuous treatment. Fibrous or particulate starting materials can be continuously treated as a slurry. Other starting materials which are in the form of continuous filaments, films, tubes, ribbons or the like can be treated continuously in accordance with this invention.

*Monomers that may be used with the method of this invention*

The classes of monomers that may be used with the method of this invention include addition type monomers or olefinic monomers such as vinyl and vinylidene monomers including acrylo, methacrylo and allylo monomers, and poly-ene monomers such as dienes, trienes, etc., said monomers including straight chain and branched chain aliphatic monomers, aromatic and aliphatic substituted monomers, and cyclic monomers including carbocyclic and heterocyclic monomers of all types.

Some of the specific monomers that may be employed with the method of this invention include methyl methacrylate, ethyl methacrylate, butyl methacrylate, methyl acrylate, ethyl acrylate, butyl acrylate, octyl acrylate, vinyl acetate, vinyl stearate, vinylidene chloride, vinylidene cyanide, styrene, divinyl benzene, acrylonitrile, vinyl pyridines, acrylamide, N-vinyl pyrollidone acrylic acid, methacrylic acid, disodium fumarate, allyl methacrylate, allyl acrylate, methyl acrylate, vinyl methacrylate, P-chlorostyrene, bis-B-chlorethylvinyl phosphonate, 4-vinyl cyclohexene, calcium acrylate, crotonic acid, B-amino-ethylacrylate, methacrylamide, 2-N-morpholinoethylacrylate, acrolein, styrene, sulfonic acid, 2,5-dichlorostyrene, N,N-dimethaminoethylacrylate acetate, pentaerythritol tetraacetate, methylenebisacrylamide, N-vinylcarbazole, 2-ethylhexyl acrylate, vinyl chloride, vinyl oleate, butadiene, isoprene, 1,3,5-hexatriene, chloroprene, ethylene, propylene, butene, maleic anhydride, methyl-2-chloroacrylate, methyl styrene, diethylmaleate, methacrylonitrile, tetrafluoro ethylene, furan, thiophene, esters of fumaric acid, and many others. Mixtures of such monomers may also be employed, in many such cases resulting in formation and deposition of copolymers. If desired, the polymeric host material may be treated successively with different monomers to yield composite products having unusual properties.

*Catalyst bonding in host material*

In the Bridgeford process, the host material to be treated is contacted with a catalyst or part of a catalyst system for effecting polymerization of the monomer or monomers to be deposited within the material, which catalyst or part of a catalyst system is capable of being chemically fixed in the host material by ion exchange reaction with chemical groups in the host.

Ion exchange reaction may be either cation exchange with the hydrogen or cation associated with chemical groups of the host material or anion exchange with anions of chemical groups of the host material. In some cases, cationic and anionic exchange groups may be present in the same host material.

The ion exchange step is carried out with the material to be chemically fixed, at concentrations, pH, and other reactions conditions to produce efficient ion exchange with the host material. As a result, this material is held by ion exchange bonding at the ion exchange sites in the host material. In other words, a salt compound is formed which is the chemical reaction product of the host material and the ion constituting a part of the polymerization catalyst system.

The conditions of pH, cation or anion source concentration, and the like, at which ion exchange will proceed between ion exchange groups in the host material and ions in the polymerization catalyst or catalyst component vary greatly with the particular host material and the particular ion source employed. The general conditions for producing ion exchange are well known in the art. The particular conditions required for particular reagents can be developed from available knowledge by any persons skilled in the art. Typical reaction conditions and literature suggesting the conditions required for any given situation are set forth in the Bridgeford patent.

In addition to the bonding of catalyst or catalyst component to the host material through salt linkages produced by ion exchange in the catalyst placement step of the Bridgeford process, the catalyst is in some cases bound at least in part through so-caled coordinate valence bonding as described in the Bridgeford patent.

*Coordinate catalyst bonding to ion exchanged host materials*

As described above, the Bridgeford process requires that an ion which is a catalyst or a component of a catalyst system be introduced into a polymeric host material by ion exchange reaction. In most cases, the ion is a reducing ion which forms part of a redox catalyst system or may be an oxidizing ion which is part of a redox catalyst system. The introduction of a catalyst or catalyst component by ion exchange reaction is effective to cause deposition of polymers into ion exchanged host materials as described in the Bridgeford patent. There are, however, certain disadvantages in the process when adapted to continuous operation. As previously noted, the continuous introduction of a catalyst component by ion exchange reaction requires the use of higher concentration of the ion in the treating solution and also the use of anaerobic conditions where the catalyst ion is the reducing component of the redox catalyst system.

Additionally, the introduction of catalyst or catalyst components by ion exchange has inherent limitations with respect to the concentration of reagents, pH, operating temperature, etc. When polymer deposition into cellulosic fibers such as cotton linters, wood pulp, etc., is desired, certain metal ions which are effective catalysts are not commercially feasible to use because they tend to degrade the cellulose molecule or in some cases leave undesirable colored residues. These problems and others that have arisen in the development of a continuous polymer deposition process have been largely overcome in this process by the use of catalyst systems in which one ionic species is introduced into the host material by ion exchange reaction and a second ionic species or molecular species is added to form a coordination complex which functions as a polymerization catalyst either alone or in association with another material separately added.

The chemical fixing of a catalyst in a polymeric host material by formation of a coordination complex is so important a feature of this invention so as to require some considerable discussion and explanation. The formation of stable coordination complexes such as hydrates, amines, etc., has been known for more than one hundred years. About 1890, Werner proposed a general theory of secondary valences which provided an explanation for the formation of many coordination compounds. In 1923, Sidgwick postulated that the central atom or cation will share electron pairs with a coordinating group to fill the shell of the next higher inert gas. He called this the effective atomic number for the complex. Later work showed that this coordination number cannot by calculated from the empirical formula of the compound, since water molecules will occupy some of the available sites in the shell and, quite often, more than the calculated amount of coordinating groups are trapped in the lattice structure of the complex.

Further explanations of the chemical and physical properties of coordination compounds and theoretical explanations of their structure may be found in "The Nature of the Chemical Bond," by Linus Pauling, Third Edition, 1960, Cornell University Press; "Chemistry of the Coordination Compounds," by John C. Bailar, Jr., 1956, Reinhold Publishing Corporation. Additionally, a number of coordination complexes of hydrazine are disclosed by Audrieth and Ogg in "The Chemistry of Hydrazine."

In carrying out this process, the host material is contacted with a solution of a cation or anion which is to be exchanged into the host at the corresponding ion exchange sites. Subsequently, the ion-exchanged host material is contacted with a solution of an anion, cation, or molecular species which can complex with the ion previously introduced by ion exchange into said host, thereby producing a catalytically active site in the host material. The host material with the catalyst complex therein is then treated with the monomer and any remaining part of the catalyst system or anything required to activate the coordination complex bound to the host.

The anchoring of the catalyst or catalyst component in the host material by complexing with an ion previously introduced by ion exchange reaction offers several distinct advantages in the subsequent processing of the host material to deposit a polymer therein. The ion exchange pretreatment of the host material followed by subsequent anchoring of the catalyst or catalyst component by complexing permits the host material to be treated in advance of the polymer deposition and store as a stable material without loss of catalytic activity due to oxidation or reduction of the bound catalyst. This procedure permits the introduction of the catalyst to the host material at the time of introduction to the reaction system.

The ion exchange treatment of the host material followed by complexing of the catalyst therewith permits a careful control of the amount of catalyst in the reaction system since the amount of catalyst added can be varied over a wider range than is possible where the catalyst itself is introduced by ion exchange reaction. This permits the variation of the amount of catalyst added and thus enables one to control accurately the reaction conditions and the amount of polymer deposited in the host material. Where the catalyst system used is a redox system, one of the redox components is coordinated with an ion introduced by ion exchange reaction and thus the amount of catalyst chemically fixed in the host material can be varied during the reaction to maintain a predetermined redox potential.

Many catalyst components which are operative in the Bridgeford polymer deposition process are intoduced into the host material by ion exchange at a pH which may be outside the range of pH required for maximum effeciency in depositing polymer into the catalyst treated host material. Thus, when the host material is treated to introduce the catalyst by ion exchange at one pH and the polymer deposition is carried out for maximum effeciency at a different pH there may be a tendency for some of the catalyst to leach out of the host material into the surrounding reaction system and thus initiate a substantial amount of bulk polymerization, i.e. polymerization of monomer in the solution surrounding the catalyst-treated host material rather than in and on the host material.

A typical example that is illustrative of this problem is the hydrazine-hydrogen peroxide catalyst system. Hydrazine is most effectively introduced into cellulosic materials by ion exchange at a pH in excess of about 9. The polymerization of many monomers using a hydrazine-exchanged host material and hydrogen peroxide is most effectively carried out at a neutral or slightly acidic pH. Under these conditions, the hydrazine is at least partially released from the host material and can cause bulk polymerization in the monomer solution which is added to the catalyst-treated host material.

When the polymer deposition is carried out in accordance with this invention, a metal cation is introduced into the host material by ion exchange reaction. The metal cation selected is one which can be introduced by ion exchange in the pH range required for maximum polymerization effeciency for the monomer which is to be deposited in the given host material. Hydrazine is then introduced and allowed to form a complex with the metal which has been thus introduced by ion exchange. Neither stability nor the reducing potential of the complex is dependent upon pH as is the compound formed by direct ion exchange of hydrazine with cellulose. The host material with hydrazine complexed to the bound metal ion can then be used with an aqueous solution of an olefinically unsaturated monomer and a small amount of hydrogen peroxide to polymerize the monomer within and upon the host material without migration of the catalyst away from the host material and the bulk polymerization which results from such catalyst migration.

An additional advantage that results from the complexing of the catalyst or catalyst component with an ion previously introduced by ion exchange reaction results from the wider range of proportion of catalyst that can be bound in the host material. Where a catalyst is introduced by an ion exchange reaction as in the Bridgeford polymer deposition process, the maximum addition of catalyst possible is one catalyst ion per available ion exchange site in the host material. When a noncatalytic ion is introduced into the host material by ion exchange reaction and the catalyst subsequently complexed therewith, there is still a limitation of addition of one ion at each ion exchange site. However, most materials which are capable of forming complexes will complex with a number of additional ions or molecules, in accordance with the principles discussed in the various references dealing with the chemistry of complexes and other coordination compounds. For example, hydrazine and ammonia form complexes with various metal ions in ratios as high as six molecules of hydrazine or ammonia per metal ion. Thus, it is possible to multiply the available chemically bound catalyst several fold by complexing the catalyst with a bound ion rather than by merely introducing the catalyst into the host material by ion exchange.

An additional advantage which is obtained by use of catalysts which are coordinated with ions bound to the host material is that it is possible to vary the redox potential of a redox catalyst system by complexion one of the catalyst components. In "Oxidation Potentials" by Latimer, 1938, Prentice Hall, Inc., a large number of oxidation potentials are listed and compared. At numerous points, Latimer demonstrates that oxidation potential is a measure of the degree in which a particular metal valence is stabilized by coordination groups. For example, ferrous to ferric ion gives an oxidation potential of −771 mv. The same ferrous ion when complexed by a cyanide group gives an oxidation potential of −360 mv. Another classical measurement is cobaltous to cobaltic oxidation with an oxidation potential of −1840 mv. When this cobaltous group is complex with six $NH_3$ groups, the oxidation potential is −100 mv. When cobaltous ion is complex with six cyanide groups, the oxidation potential is +0.8 volts. In the latter case, the complexing of the cobaltous ion has changed it from reducing to oxidizing. The potential of the coordinating group is a function of the electronegativity of the original ion, the radius of the metal ion, and the structure of the complexing group.

These examples show that a very substantial modification of the redox potential of a catalyst system can be obtained by appropriate complexing of at least one member of the catalyst system. In extensive experimental work done with the Bridgeford polymer deposition process, it has been found that for certain monomers the use of a catalyst system having a redox potential in excess of ±400 mv. gives rise to bulk polymerization. This bulk polymerization can be avoided in such cases by use of a complexed catalyst having a redox potential less than ±300 mv.

*Control of reaction conditions*

In carrying out this process, the degree of control of reaction conditions is different for continuous and for batch processes. While the concept of careful control of reaction conditions is primarily utilized in the continuous polymer deposition process, it is just as applicable to batch type processing.

In carrying out this process, it is generally desired to maintain the redox potential within the range from −200 to +200 millivolts where a redox catalyst system is used. Redox potential measurements are made by use of a platinum electrode against a standard glass-calomel mercury electrode and a Beckman G. pH-meter. By this procedure, the redox potential of the catalyst system can be continuously monitored and adjustments made in the feed rate of reductant and oxidant (for a redox catalyst system) to maintain a substantially constant predetermined potential. It has been found that the most useful range of redox potential for controlled polymer deposition has been the range from about −200 to +200 millivolts for the entire redox catalyst system, starting with the reducing stage and finishing with the oxidizing stage. In this range, there is a minimum of free latex formation resulting from bulk polymerization and excellent monomer conversion.

When potential measurements are made for free hydrazine and hydrogen peroxide, the reducing and oxidizing potentials are in excess of −400 and +400 millivolts, respectively. When hydrazine is complexed with a metal ion which as previously been introduced by ion exchange into a host material, such as cellulose, the redox potential is decreased to a value within the preferred range thus making the polymerization more controllable, limiting the polymer growth to the desired loci, and yielding a minimum of latex resulting from bulk polymerization.

In a continuous polymer deposition process, the redox potential measurements are made at selected points along the process equipment, and the pH and redox potentials are maintained at substantially constant predetermined values at the points of measurement.

*Various types of products made by the method of this invention*

This process is applicable to the production of any of the many products made by the Bridgeford polymer deposition process. For example, by the use of this invention, I may produce a fibrous casing having deposited within the paper phase near the interior surface and on the interior surface thereof polymers such as methyl, ethyl, propyl, butyl, amyl, hexyl, heptyl, octyl, nonyl, and deca acrylates or methacrylates. Such products are characterized by the fact that they have less adhesion to meat which may be encased therein.

The practice of this invention may also be used to produce, for example, a cellulose casing to whose outer layers has been depoisted an amino acrylate or methacrylate and which is anchored to a polymer coating by means of a diisocyanate; the amino compound may include, as an example, beta-amino ethyl acrylate and methacrylate and the like. The plastic or rubber polymer coating includes those containing an active hydrogen atom capable of reacting with the isocyanate group. Regenerated cellulose films and fibrous films which have been made hydrophobic with the deposition of a hydrophobic polymer may be coated with polyethylene.

A laminate may be produced by depositing a polymer within a cellulose or cellulosic material and embedding the thus treated sheet or film in more of the same or similar polymer. Examples of the foregoing are the treatment of wood or plastic sheets with the monomers used in the practice of this invention, and embedding them in the pre-formed plastic material.

Cellulose films may be modified by deposition of a basic polymer throughout or within the surface layers and then dyed with an acid dye to make a fast dyeing. Likewise an acid polymer may be deposited into the cellulose and a basic dye used.

By the practice of this invention polymer films may be treated by depositing therein an appropriate polymer in order to adjust the gas permeability of the polymeric film to a desired level. Likewise, I can produce plastic films whose permeability has been adjusted to a predetermined value by the controlled deposition of another polymer within the first.

Film which is suitable for use in the production of laminates of the type described, for example, in U.S. Patent No. 2,679,968 and U. S. No. 2,679,969 may be produced by depositing to the surface of a polymer film another polymer so that the electrostatic charge on the first said film is controlled in order to increase the cohesion between the films.

The technique of this invention may also be utilized by depositing on or in an electrically non-conducting polymer by means of printing on the polymer a catalyst in the form of a printed circuit.

The method of this invention is useful in effecting a substantial improvement in cellulose and other plastic film with respect to such important characteristics as printability, adhesion to other materials, heat sealing, decrease in moisture vapor permeability and decrease in static charge. This process may be used with good results to improve the wet strength, dry flexibility and grease proofness of paper and the like. It will also be seen that fibers of many types can be improved with respect to their dyeing qualities, crease resistance, extensibility, tensile strength, elasticity and resistance to moisture or chemical attack, by treatment of the fibers as per my novel method. The process is likewise applicable in effecting improvements in certain characteristics of wood so as to effect an increase in its resistance to weathering, rot, flammability and the like.

In accordance with the process of this invention, I am able to produce a novel cellulose film or fiber which has deposited within the gel phase or localized at the surface layers, polymers of such compounds as ethyl acrylate; p-chlorostyrene; 2,5 dichlorostyrene; N,N dimethyl amino ethyl acrylate; n-butyl acrylate; n-octyl acrylate; n-butyl methacrylate; allyl acrylate; beta-amino ethyl acrylate, and methylene bis acrylamide.

Application of polyethylene by "melt coating" techniques onto cellulose can be facilitated in accordance with this invention by first applying to the surface layers of cellulose gels, thin layers of a rather non-polar molecule like polybutylacrylate, methacrylate, or somewhat higher esters, which are attached to the cellulose molecules and become a "primer" coating. The hydrocarbon chains of acrylic or methacrylic esters being miscible with the polyethylene above the melting range of the higher esters would permit good adhesion. This same technique is also applicable to the lamination of other materials, which are chemically dissimilar; good adhesion, which is otherwise not achievable, being obtainable with my technique.

Cellulose sponges may likewise be treated in accordance with this invention so as to contain a homogeneous dispersion of a material such as poly ethyl acrylate, poly n-butyl acrylate, poly n-octyl acrylate, poly n-butyl methacrylate, and the like.

A weather resistant and rot resistant wood can be prepared by depositing thereon in accordance with the technique of my invention a polymer derived from pentachlorophenyl acrylate.

Gels of various kinds can also be prepared containing depositions of various polymeric materials. Thus agar agar gels can be prepared having deposited on the surface thereof or in the gel phase, a deposit of a material such as polyacrylonitrile, polymethyl methacrylate and the like. Calcium alginate gels may be prepared having deposited in the gel phase or on the surface such materials as polymethyl methacrylate, polyacrylonitrile, polymethyl acrylate, polyethyl acrylate.

By use of the method of this invention host and guest polymers can be rendered resistant to solvents in solvents which normally dissolve either polymer throughout the volume or any selected part of the host material.

A shaped gel structure containing ion binding groups may be used as a "mold" for the deposition of the guest polymeric material in accordance with the method of this invention. If the gel is a relatively dilute one, then the resulting host-guest composite may be mostly guest polymer so that this is a means of forming a structure without passing the bulk guest polymer through a molten or plastic state. For heat sensitive guest polymers or those that may be dissolved only in expensive solvents, this process may be of interest.

Since the method of this invention depends upon the chemical nature of the host material rather than its physical form, the deposition may be made into films, fibers, granules, paper, batts, molded structures or any formed article.

The uniform deposition or controlled localized deposition can lead to synthesis of films, membranes, papers, mats, fabrics, batts, beads, and the like that have various amounts of polymers deposited into them where the guest polymer is capable of ion or electron exchange. Thus the host formed structure can be modified by various amounts of polymer add-on so that the space remaining for diffusion of anions or cations into the ion exchange bead, membrane, or fabric is limited to those below a certain size.

Examples of ion exchange membranes that are suitable are cellulose fibers with polyacrylic acid or polyvinyl pyridine deposited into them.

The localization aspect of the process of this invention permits the manufacture of novel films or fibers where an acid polymer is deposited at one site and a basic polymer at another site in a host film or fiber. Alternatively, sheath deposition of two different polymers into the two sides of a film is possible.

The films with both anion and cation exchange sites will find use in chemical separation, synthesis, analysis, differential dyeing, and so forth.

Films into which acid or basic polymers have been deposited in accordance with this invention may be used for catalysis. Since a wide range of polymers can be deposited into a host film or bead, a wide range of acid or basic strengths in the film is available. Also, since the steric factors can be controlled, the possibility of catalyzing the reaction of only one of a mixture of molecules where some cannot enter the resin is present.

The guest polymer may itself contain chemical groupings capable of ion exchange, oxidation-reduction, complex formation, or other chemical reactions. Thus the guest polymer deposited into the host in relatively low concentration by the method of this invention (a) may serve as the locus for binding catalysts for a subsequent deposition of a second polymer alternatively, or (b) may contain chemical groupings that can participate directly in catalyst systems.

Dialysis beads, membranes, fibers and the like can be made using the method of the present invention by insolubilizing the surface or surface layers of gels of low solids content.

The guest polymer deposited in accordance with this invention may be used in additional reactions after deposition into the host article. Thus a deposited polymer may make one component of a coupled dye. An unsaturated guest polymer may take part in reactions of its residual unsaturation of types well known in the art.

Thermoplastic host materials can be used for deposition of a guest polymer that can cross-link physically or chemically to increase the softening point of the host article. Deposition of a guest polymer of high melting point can give rise to a rigid gel above the liquefaction temperature of the host material.

Polymer deposition in accordance with this invention may serve as a preliminary step before or as an intermediate step in other processing of articles. Thus, a fiber or yarn may have its surface modified to change its weaving or felting characteristics. Polymer deposition may serve as an intermediate coating or surface modification of a film or fiber for coating with the same or a different separately formed polymer or resin coating.

Dialysis membranes, gas mixtures resolving membranes, packaging films, and the like may be insolubilized by use of the method of the instant invention so that they may be used in media in which the host material would dissolve.

Sorbants may be modified by polymer deposition uniformly or in a controlled non-uniform manner in accordance with this invention to include or exclude solvents or other materials sorbed as in chromatographic sorption.

The surface-layer and interior-layer deposition of a polymer into a host film by use of the method of this invention permits the making of novel bases for photosensitive materials or even films that contain a localized deposition of a guest polymer that is itself photosensitive.

The deposition process of this invention permits the intimate "mixing" of two or more polymers that do not have a common solvent or dispersion medium. Thus a formed structure can be made of the polymer most easily formed and one or more additional polymers introduced as the monomer and polymerized in situ.

As heretofore mentioned, one of the distinguishing characteristic or features of this invention lies in the fact that it permits limiting the deposition of a polymer to the surface layers or gel phase of the materials being treated. By this method, I am therefore able to produce cellulose films, for example, having deposited in the gel phase or on the surface layer thereof, such materials as polystyrene, methyl methacrylate, polyvinyl acetate, polyacrylonitrile, polyacrylic acid, poly-methacrylic acid, and polyacrylamide. Polyethylene film having a surface deposition of poly-methacrylate can also be prepared in this way.

Animal fibers, particularly wool, can be treated so as to have deposited in the gel phase or at the surface thereof, a deposit of such materials as poly acrylic acid, poly methyl methacrylate, and poly acrylonitrile.

Improvements in the characteristics of paper can be secured by treating the paper in accordance with my invention so as to secure thereon a localized deposition of a polymer such as polybutyl acrylate, polybutyl methacrylate, polymethyl methacrylate, polyvinyl acetate, and polyacrylonitrile.

Silk may also be advantageously treated in accordance with the method of my invention so as to secure a localized deposition, either in the gel phase or at the surface of such polymeric materials as polyvinyl acetate, and polymethylmethacrylate.

Film materials which are to be used as wrappings or "casings" for food products such as cheese, meat, including sausage and the like, can be prepared by treating the film material, for example the regenerated cellulose casings of commerce, in accordance with the hereinbefore described methods to modify the moisture-proofness, printability and other characteristics of the base film.

It is to be understood, of course, that monomer mixtures can be used for polymer deposition. Examples of such copolymerizations encompassed within the present invention are those illustrated by, for example, acrylonitrile-styrene into cellulose; acrylonitrile-ethylacrylate into wool; vinylacetate-ethylacrylate into cellulose, to mention a few.

It is to be remembered that the features of this process which are concerned with the use of a complexed catalyst are useful in the production of any of the aforementioned products. The features of this process which relate to a continuous polymer deposition process are, of course, limited to the production of products from various host materials which are in a fibrous or particulate form or other form suitable for continuous processing. Cellulosic fibers, such as cotton linters, wood fibers, and the like, which are modified by deposition of polymers therein in accordance with this process have markedly superior properties when used as fillers for molded plastics. Such polymer modified fibers and pulps can also be used in the preparation of papers, non-woven fabrics and other similar webs.

*Experimental procedure*

A series of experiments were carried out over an extended period of time in which various polymers were deposited into fibrous materials in accordance with this process. The following description of the experimental procedure followed is directed primarily to the deposition of the polymers into cotton linters or wood pulp but obviously can be applied to the processing of other polymeric host materials having ion exchange capacity.

The sequence of process steps and process variables studied correspond to the sequential processing followed in a continuous process and provide the control data necessary for continuous processing.

In the several experiments carried out to demonstrate the operability of this process, the deposition of polymer into relatively large batches, e.g. one kilogram or more, was carried out successfully. Cotton linters or wood pulp were washed in a commercial washing machine, to break up and disperse the fibers and to remove any residues from the bleaching process. It is desirable to eliminate foreign materials such as waxes or polysaccharides which would inhibit ion exchange and to break up and disperse fibers from sheets of wood pulp or batts of cotton. The washed pulp is centrifuged and then placed in distilled water in a 25 gallon stainless steel drum. The selected metal salt is added for ion exchange reaction. The stainless steel drum is closed and provided with a reflux condenser and external heating coils. The drum is mounted for rocking motion and agitation is provided by rocking the drum through the entire reaction. The initial slurry of pulp or fibers with the solution of salt provided for ion exchange reaction is warmed up to 70° C. to eliminate entrapped air.

Hydrazine or other suitable reducing agent is then added to form a coordination complex with the metal salt which was ion exchanged to the pulp or fiber. A period of about 15 minutes is allowed for the complex to form and to stabilize. The formation and stabilization of the catalyst complex is monitored by taking pH and redox potential measurements. Repeated readings are taken to follow the formation and stabilization of the complex which is usually quite rapid.

Next, the olefinically unsaturated polymer is added in the form in which it is received commercially, containing 20–25 p.p.m. of inhibitor, and given time to disperse (complete solution is not necessary) throughout the batch. Then, hydrogen peroxide or other suitable oxidant is added and again, redox potential and pH are measured and adjusted. If the peroxide which is added in extremely dilute solution happens to be weak, the redox potential measurement will indicate the need for more reagent.

In practice, methyl methacrylate and similar esters work best with the complexed hydrazine-hydrogen peroxide redox catalyst system in the pH range of 6–6.5, while non-ester monomers, such as styrene, require a pH range of about 4–4.5 for high efficiency of polymerization. The reactor is held for a period of two to four hours at reflux and then cooled to about 70° C.

After cooling, the polymer-modified fibers or pulp are separated from the slurry. The fibers are washed with water and centrifuged prior to drying. The polymer-modified fibers or pulp are then dried in a rotary type laundry dryer. The polymer modified fibers or pulp are tumbled in the dryer while being subjected to circulating air at a temperature of about 57° C.

After drying, final yield measurements are taken on the dried material. The product is placed in a closed plastic film bag for 24 hours to allow the moisture content to equilibrate. The yield is calculated on the basis of a bone dry yield, compared to the bone dry weight of the original fibers or pulp. In most cases, a sample of the polymer-modifier fibers or pulp is subjected to solvent extraction using a solvent having a high capacity for dissolving the free or unattached polymer of the monomer used in the reaction. A determination is thus made of the amount of the polymer which can be removed by solvent extraction. It is assumed that the difference between the calculated yield and the amount of extracted polymer gives a measure of the graft polymer addon.

The following non-limiting examples are illustrative of the scope of this invention.

EXAMPLE 1

*Poly (methylmethacrylate) on cotton linters*

A 1,000 g. portion of cotton linters was washed in a commercial washing machine as previously described to break up and disperse the fibers and remove any residues from the bleaching process. The cotton used had an ion exchange capacity of four millimoles (present as carboxyl groups) per 1,000 g. of cellulose.

The washed cotton linters were then centrifuged and formed into a 2.5% slurry in distilled water in a 25 gallon stainless steel drum. Sufficient cadmium sulfate was then added to the drum to provide 12 millimoles cadmium ion. The drum was then closed, provided with a reflux condenser and external heating coils. Agitation of the reaction contents was maintained by rocking the drum throughout the entire reaction period.

The slurry containing dissolved cadmium salt was warmed to 70° C. to eliminate entrapped air. Next, 310 g. methyl methacrylate, containing 20–25 p.p.m. inhibitor, were added to the slurry and given time to disperse throughout the entire batch. Sufficient hydrazine (20 mmol.) and dilute $H_2SO_4$ were added to produce a redox potential of −30 mv. (millivolts) and a pH of 6.0 for the mixture. Then, sufficient dilute hydrogen peroxide (50 mmol.) was added to produce a pH of 6.0 and a redox potential of +110 mv. At the completion of the reaction, the system had a pH of 5.8 and a redox potential +250 mv.

The reactor was maintained at a temperature of 87° C., for a period of 4.5 hours following the addition of hydrogen peroxide. During this time, there was no visible latex formation resulting from bulk polymerization in the aqueous phase.

The reactor was then cooled to 70° C. and the slurry dewatered. The product was washed and centrifuged and then placed in a laundry dryer where it was tumbled in circulating air maintained at a temperature of about 57° C.

The product consisted of 1230 g. of polymer-deposited cotton. The polymer add-on amounted to 23% based on the bone dry weight of cotton treated and represented 18.7% of total product weight. (Monomer conversion was 74%.)

EXAMPLE 2

A 1000 g. portion of cotton linters (having four millimoles ion exchange capacity per 1000 g. cellulose) was washed and centrifuged as in the previous example. The cotton was mixed with sufficient distilled water to form a 3% slurry. After warming the slurry to 70° C. to eliminate dissolved air, sufficient ferrous ammonium sulfate was added to provide four millimoles of ferrous ion.

Next, 290 g. of methyl methacrylate monomer (containing 25–50 p.p.m. inhibitor) was added and dispersed through the reaction mixture. At this point, the pH was 6.1 and redox potential was +170 mv. for the mixture. Sufficient ammonium hydroxide (10 mmol.) and hydrazine hydrate (5.5 mmol.) were then added to produce a redox potential of +10 mv. and pH of 6.4 for the mixture. After about 15 minutes (time required for formation of ammonia-hydrazine-ferrous ion complex), sufficient, hydrogen peroxide (34 mmol.) was added to produce a pH of 6.0 and redox potential of +150 mv.

The stainless steel reaction drum was then closed and provided with a reflux condenser and external heating coils. Agitation was maintained by rocking the drum throughout the reaction period. The reaction was carried out for a period of 3.1 hours following the addition of the hydrogen peroxide, while maintaining the reactor at a temperature of 94° C. At the completion of the reaction, the system had a pH of 6.1 and redox potential of +150 mv.

At the end of the reaction period, the reactor was cooled to about 70° C. and the slurry dewatered. The polymer-modified cotton linters were then washed, centrifuged, and dried in a laundry dryer at 57° C. In this example, there were obtained 1200 g. of dried product. There was a 69% conversion of the monomer and the product contained a 20% add-on of polymethylmethacrylate based on the bone dry weight of the fibers treated.

EXAMPLE 3

A 1000 g. portion of cotton linters (having four millimoles ion exchange capacity) was washed, centrifuged, and formed into a reaction slurry as described above. The washed cotton linters were mixed with a sufficient amount of distilled water to form a 2.5% slurry. Sufficient ferrous ammonium sulfate was added to provide four millimoles of ferrous ion after the slurry in the stainless steel reactor had been agitated and heated to 70° C. to remove entrapped air.

At this point, 307 g. of methyl methacrylate, containing 20–25 p.p.m. inhibitor, were added to the slurry and allowed to disperse.

Next, 7.5 mmol. of hydrazine hydrate were added to form a hydrazine-ferrous ion complex. Then, 22.5 millimoles of hydrogen peroxide were added. At this point the mixture had a pH of 5.6 and redox potential of +180 mv. The reactor was held at a temperature of 99° C. for a period of 4.4 hours.

At the end of the reaction period, the mixture had a redox potential of +150 millivolts and a pH of 6.5.

At the end of the 4.4 hour reaction period (measured from the time of addition of hydrazine peroxide) the reactor was cooled to 70° C. and the slurry dewatered. The treated fibers were then washed and dried as described in the previous examples. In this run, there was a 68.5% conversion of methyl methacrylate monomer and a 21% add-on of polymethylmethacrylate based on the dry weight of the fibers treated.

EXAMPLE 4

The procedure of Example 3 was repeated, using the same quantities of cotton linters, ferrous ion, hydrazine, and hydrogen peroxide. In this run, 309 g. of methylmethacrylate monomer (containing 20–25 p.p.m. inhibitor) were used. Reaction was carried out at 99° C. for a period of 4.5 hours following addition of the hydrogen peroxide.

After addition of hydrazine, the redox potential was +10 millivolts and pH was 6.5. After addition of hydrogen peroxide, the redox potential was +155 millivolts and pH was 6.2. At the end of the reaction, the redox potential was +220 millivolts and the pH was 6.1.

At the end of the reaction period, the slurry was dewatered, washed, centrifuged and dried as described above. The dry weight of polymer deposited product contained was 1190 g., representing 19% polymethylmethacrylate add-on based on dry weight of cotton fibers treated. There was a 63% conversion of the methyl methacrylate monomer.

EXAMPLE 5

A 1000 g. portion of cotton linters (having an ion exchange capacity of four millimoles) was washed, centrifuged, and formed into a reaction slurry as described in the preceding examples. The cotton linters were mixed with sufficient distilled water to provide a 2% slurry, using the stainless steel reaction drum described in the previous examples.

Sufficient aluminum sulfate was added to the reaction slurry to provide four millimoles of aluminum ions. Then, 312 g. of methyl methacrylate monomer (containing 20–25 p.p.m. of inhibitor) were added and allowed to disperse through the reaction mixture. The mixture containing aluminum ion added by ion exchange reaction was heated to 70° C. and agitated to evolve entrapped oxygen. At this point the slurry had a pH of 5.4 and redox potential of +240 mv. Next, 7.5 millimoles of hydrazine (as hydrazine hydrate) were added to the mixture. At this point, 60 millimoles of hydrogen peroxide were added.

The stainless steel drum was agitated and maintained at a reaction temperature of 99° C. for a period of 4.8 hours following addition of the hydrogen peroxide.

After addition of the hydrazine, the system had a redox potential of +40 millivolts and a pH of 6.25. After addition of the hydrogen peroxide, the redox potential was +100 millivolts and pH was 6.0. At the end of the reaction period, the redox potential was +220 millivolts and pH was 5.1.

At the end of the reaction period, the reactor was allowed to cool to 70° C. and the polymer modified fibers were dewatered. The treated fibers were then washed, centrifuged, and dried as described in the previous examples.

In this run, there was a 75% conversion of the methyl methacrylate monomer and 23.5% polymer add-on in the cotton fibers, based on dry weight of the cotton (yield of polymer deposited fibers was 1235 g.).

EXAMPLE 6

The procedure of Example 5 was repeated using 1000 g. cotton linters in a 1.85% slurry of distilled water. Four millimoles of aluminum sulfate were introduced by ion exchange into the cotton and ten millimoles of hydrazine added as described above. There was then added 46 millimoles of hydrogen peroxide. Five hundred twenty g. of inhibited methyl methacrylate monomer were added. The reaction was carried out for five hours at a reaction temperature of 104° C.

After addition of the hydrazine, the mixture had a redox potential of +5 millivolts and a pH of 6.35. After addition of the hydrogen peroxide, the redox potential was +135 millivolts and the pH was 6.2. At the end of the reaction period, the redox potential was +200 millivolts and the pH was 5.9.

At the end of the reaction period, the slurry was dewatered and the polymer modified fibers were washed and dried as in the previous examples. There was a 64% conversion of the methyl methacrylate monomer. A yield of 1334 g. of cotton containing deposited polymethylmethacrylate was obtained. There was 33.4% add-on of polymethylmethacrylate within and upon the cotton fibers.

EXAMPLE 7

A 1000 g. portion of cotton linters (having an ion exchange capacity of four millimoles) was washed, centrifuged and formed into a reaction slurry as described in the preceding examples. The washed linters were mixed with sufficient water to provide a 1.5% slurry. There was then added sufficient amount of ferric chloride to provide four millimoles ferric ion. By this process, the ferric ion is introduced into the cotton by ion exchange reaction with the carboxyl groups therein. The stainless steel reaction drum was heated to 70° C. and agitated to evolve entrapped air from the cotton fibers. Next, 307 g. of inhibited methyl methacrylate monomer were added to the slurry of cotton fibers. There was then added 16 millimoles of hydrazine, as hydrazine hydrate, to form a complex with the chemically bound ferric ion in the cotton. Thirty millimoles of hydrogen peroxide were then added to initiate the reaction. The reaction was maintained at a temperature of 100° C., for a period of 4.5 hours following addition of the hydrogen peroxide.

After addition of hydrazine, the redox potential was +20 millivolts and the pH was 6.5. After addition of hydrogen peroxide, the redox potential was +125 millivolts and pH was 6.1. At the end of the reaction period, the redox potential was +200 millivolts and pH was 5.7.

In this run, there was a 66% conversion of the methyl methacrylate monomer and a product yield of 1200 g. of cotton and deposited polymethylmethacrylate. The add-on of polymethylmethacrylate within and upon the cotton fibers was 20% based on dry weight of the cotton fibers treated.

EXAMPLE 8

Procedure of Example 7 was repeated using (slightly) larger quantities of methyl methacrylate monomer and hydrazine. A 1000 g. portion of cotton linters was treated with sufficient ferric chloride to add four millimoles of ferric ion to the cotton ion exchange reaction. To this mixture was then added 520 g. inhibited methyl methacrylate monomer. There was then added 13.3 millimoles f hydrazine (as hydrazine hydrate) to the treated cotton fibers to form a hydrazine-ferric ion complex. Next, there was added 46 mmol. of hydrogen peroxide to initiate reaction. The reaction was carried out at 100° C. for a period of five hours following addition of the hydrogen peroxide.

After addition of hydrazine, the redox potential was −20 millivolts and pH was 6.4. After addition of hydrogen peroxide, the redox potential was +115 millivolts and pH was 6.5. The final redox potential was +240 millivolts and pH was 4.9.

In this run, there was 84% conversion of methyl methacrylate monomer and a dry product yield of 1437 g. There was a polymethylmethacrylate add-on of 43.7% based on dry weight of cotton fibers treated. Under the reaction conditions used, all of the polymerization took place within and upon the cotton fibers. There was no visible latex formation or other indication of bulk polymerization.

EXAMPLE 9

*Polymethylmethacrylate deposited in bleach kraft pulp*

A 1000 g. portion of bleached kraft wood pulp (having an ion exchange capacity of 36 millimoles) was washed and centrifuged using a commercial laundry machine as previously described. The pulp was then mixed with sufficient distilled water to form a 2.5% slurry in the stainless steel reaction drum. There was then added to the slurry sufficient cadmium sulfate to provide 18 millimoles cadmium ion. The cadmium sulfate was introduced into the carboxyl groups (ion exchange sites) in the cellulose by ion exchange reaction.

At this point, 270 g. inhibited methyl methacrylate monomer was mixed with the slurry. After deaeration, 18 millimoles of hydrazine (as the acid sulfate salt) was mixed into the slurry to form a hydrazine complex with the chemically bound cadmium ion. Forty-four millimoles of hydrazine peroxide were added to initiate reaction. The reaction mixture was maintained at a temperature of 94° C. for a period of three hours following the addition of the hydrogen peroxide.

After addition of hydrazine and acid, the redox potential of the mixture was +20 millivolts and pH was 6.4. After addition of hydrogen peroxide, the redox potential was +165 millivolts and pH was 5.6. At the end of the reaction period, the redox potential was +220 millivolts and pH was 5.4.

At the end of the reaction period, the slurry was allowed to cool to 70° C. and dewatered. The treated pulp fibers were washed and dried using a commercial laundry dryer at a temperature of 57° C.

In this run, there was a product yield of 1160 g. of polymer-deposited pulp. There was a 16% add-on of polymethylmethacrylate based on the bone dry weight of pulp treated. In this run there was no visible latex formation or any other indication of bulk polymerization.

EXAMPLE 10

A 1000 g. portion of bleached kraft wood pulp was washed, centrifuged, and mixed with sufficient water to form a 2.5% slurry. To this slurry, after deaeration, there were added 27 millimoles of ferrous ion, as ferrous ammonium sulfate. At this point, 274 g. inhibited methylmethacrylate were added to the slurry in the stainless steel reaction drum. Then, 65 millimoles of hydrazine, as hydrazine hydrate, were added to form a hydrazine complex with the bound ferrous ion. Then, 90 millimoles of hydrogen peroxide were added to initiate the reaction.

The reaction mixture was retained at a temperature of 94° C. for a period of 3.4 hours following addition of the hydrogen peroxide.

After addition of hydrazine, the redox potential was −25 millivolts and pH was 6.8. After addition of hydrogen peroxide, the redox potential was +260 millivolts and pH was 5.4. At the end of the reaction period, the redox potential was +320 millivolts and pH was 3.9. There was no visible latex formation or any other indication of bulk polymerization in the reaction mixture.

At the end of the reaction period, the mixture was allowed to cool to 70° C. and dewatered. The polymer deposited pulp was then washed and dried using a commercial laundry dryer as described in the previous examples. There was an 89% conversion of the methyl methacrylate monomer and the product yield of 1245 g. There was a polymer add-on of 24.5% within and upon the wood pulp fibers.

The run just described was repeated twice using a 3% wood pulp slurry, 23 millimoles of added ferrous ion, 58 millimoles of hydrazine, and 68 millimoles of hydrogen peroxide. The reaction was carried out for a period of 1.5 hours following addition of the hydrogen peroxide, at temperatures of 75–77° C.

In one of these runs, there was a yield of 1190 g. of polymer-deposited pulp. In the other run, a yield of 1240 g. of polymer-deposited pulp.

EXAMPLE 11

A 1000 g. portion of bleached kraft wood pulp (having an ion exchange capacity of 36 millimoles) was washed and centrifuged as described in the previous examples. The washed pulp was mixed with 330 g. of methyl methacrylate monomer and with sufficient distilled water to provide a 2.5 slurry and sufficient ferrous ammonium sulfate added to provide 27 millimoles of ferrous ion. Next, 86 millimoles of ammonium hydroxide were added and the pH adjusted by addition of a small amount of sulfuric acid.

As in the previous examples, the slurry was formed in the stainless steel reaction drum and all subsequent treatments and reactions took place therein. After sufficient time was allowed for deaeration and formation of the ammonia-ferrous complex, 54 millimoles of hydrogen peroxide were added to initiate reaction. The mixture was maintained at a reaction temperature of 93° C., for a period of 1.3 hours following addition of hydrogen peroxide.

After addition of hydrazine, the redox potential was +175 millivolts and pH was 6.0. After addition of hydrogen peroxide, the redox potential was +310 millivolts and pH was 5.8. At the end of the reaction period, the redox potential was +320 millivolts and pH was 5.0.

At the end of the reaction period, the slurry was dewatered and the polymer deposited pulp was washed and dried as described in the previous examples. There was a 68% conversion of methyl methacrylate monomer. The yield of polymer-deposited pulp was 1225 g., having a polymer add-on of 22.5% based on dry weight of the wood pulp.

EXAMPLE 12

Several additional experiments were carried out in which polymethylmethacrylate was deposited into bleached kraft wood pulp using ammonia or hydrazine complexed with ferrous ion as the fixed portion of redox catalyst couple.

In one experiment, the bleached pulp was washed, formed into a 2.5% slurry in distilled water, deaerated, treated with 27 millimoles of ferrous ion (added as ferrous ammonium sulfate). Next, 340 g. of inhibited methyl methacrylate monomer were added and allowed to mix throughout the slurry. Sufficient ammonia (27 mmol.) as NH$_4$OH, was added to complex with ferrous ion to provide a redox catalyst component. Then, 27 millimoles of hydrogen peroxide were added to initiate reaction.

The reaction mixture was maintained at a temperature of 92° C. (measured at the top of the reflux condenser) for a period of 2.6 hours following addition of the hydrogen peroxide.

After addition of hydrazine, the redox potential was +130 mv. and pH was 6.6. After addition of hydrogen peroxide, the redox potential was +340 mv. and pH was 5.8. At the end of the reaction period, the slurry had a redox potential of +330 mv. and pH of 4.7.

In this run, there was a 77% conversion of methyl methacrylate monomer and a product yield of 1260 g., representing 26% polymer add-on based on the dry weight of wood pulp treated.

In the second run, 1000 g. of pulp were washed and formed into a 1.85% slurry, admixed with 530 g. of methyl methacrylate monomer, in the stainless steel reaction drum. After de-areation, sufficient ferrous ammonium sulfate was added to provide 16.6 millimoles of ferrous ion. Then, sufficient ammonium hydroxide was added to provide 27 millimoles of ammonia for complexing with ferrous ion. Next, 27 millimoles of hydrogen peroxide were added to initiate reaction.

The reaction mixture was maintained at a temperature of 101° C. for a period of four hours following addition of hydrogen peroxide.

The reaction was monitored by redox potential and pH measurements as described above.

At the end of the reaction period, the slurry was allowed to cool to 70° C. and dewatered. The polymer deposited pulp was then washed and dried. There was an 82% conversion of methyl methacrylate monomer and a 43.5% add-on of poly(methylmethacrylate) on the pulp. The yield of product was 1435 g. based on dry weight of the pulp.

In a third run, the process was varied by substituting hydrazine for part of the ammonia used in the catalyst system.

In this run, 1000 g. of bleached kraft wood pulp were washed, centrifuged, and diluted with distilled water to form 2.5% slurry, in admixture with 316 g. methyl methacrylate monomer, in the stainless steel reactor.

The pulp slurry was then treated with sufficient ferrous ammonium sulfate to produce 20 millimoles of ferrous ion for introduction into the pulp by ion exchange reaction. Next, 12.5 millimoles of ammonium hydroxide and 15 millimoles of hydrazine hydrate were added to form an ammonia-hydrazine complex with the chemically bound ferrous ion in the wood pulp.

Thirty millimoles of hydrogen peroxide were then added to the mixture to initiate reaction.

The reaction mixture was maintained at a temperature of 100° C. (measured at the top of the reflux condenser) for a period of 4.2 hours following addition of hydrogen peroxide. The reaction was monitored by taking redox potential and pH measurements as described above.

In this run, there was an 83% conversion of methyl methacrylate monomer and a product yield of 1263 grams. There was a polymer add-on of 26.3% based on dry weight of the wood pulp treated.

EXAMPLE 13

*Polystyrene deposited in cotton linters*

A series of experiments were carried out in which polystyrene was deposited into cotton linters using a hydrazine-hydrogen peroxide redox catalyst system. The hydrazine was bound in the form of a complex with ferric ion previously introduced into the cotton by ion exchange reaction. The procedure followed in these runs was substantially that described in the previous examples. The cotton was washed and formed into a dilute slurry in distilled water in the stainless steel drum. A small amount of ferric chloride was added to the slurry to introduce ferric ion into the cotton by ion exchange reaction. The styrene monomer was then added and dispersed in the reaction mixture. Hydrazine was added to complex with ferric ions and in some cases, a small amount of sulfuric acid was added to adjust the initial pH of the reaction mixture. Hydrogen peroxide then was added to initiate reaction. Redox potential and pH readings were taken as described in the previous examples. The reaction was carried out for a time ranging from 3 to 5 hours following addition of the hydrogen peroxide. Product yields ranged from 1110 g. to 1380 g.

The details of reaction conditions and the results obtained are set forth below in Table I:

TABLE I

| Run No. | 13(a) | 13(b) | 13(c) | 13(d) |
|---|---|---|---|---|
| Percent Slurry in water | 3 | 1.85 | 1.85 | 1.85 |
| Monomer added, g | 208 | 313 | 313 | 520 |
| $Fe^{+++}$—$FeCl_3$, mmol | 4 | 4 | 4 | 4 |
| Sulfuric acid, m. eq | 2 | 20 | 20 | 6.7 |
| $N_2H_4$, mmol | 10 | 20 | 0 | 20 |
| 1st redox potential, mv | +145 | +130 | −75 | −25 |
| 1st pH reading | 4.2 | 4.5 | 7.4 | 6.5 |
| $H_2O_2$, mmol | 20 | 33 | 33 | 33 |
| 2nd redox potential, mv | +240 | +230 | +190 | +220 |
| 2nd pH reading | 4.5 | 4.65 | 4.6 | 4.45 |
| Reactor top temp., °C | 90 | 98 | 101 | 98 |
| Final redox potential, mv | +225 | +225 | +230 | +210 |
| Final pH reading | 4.0 | 4.3 | 4.2 | 3.45 |
| Reaction time after $H_2O_2$ addition, hrs | 3.0 | 5.0 | 5.0 | 4.3 |
| Product yield, g | 1,110 | 1,223 | 1,284 | 1,380 |
| Percent polymer addon | 11 | 22.3 | 28.4 | 38 |
| Percent monomer conversion | 53 | 71½ | 91 | 73 |

EXAMPLE 14

In this run, a 1000 g. portion of cotton linters (having an ion exchange capacity of four millimoles) was washed and centrifuged as described in the previous examples. The cotton linters were then diluted with sufficient distilled water to form a 3% slurry in the stainless steel reactor drum. Then, four millimoles of cadmium ions (as cadmium sulfate) were introduced into the slurry and 12 milliequivalents of sulfuric acid were added for adjustment of pH. Two hundred nine g. of styrene monomer were then added to the slurry and allowed to disperse.

At this point, ten millimoles of hydrazine (as hydrazine hydrate) were added to the slurry to form a hydrazine complex with the cadmium ion bound by ion exchange reaction to the cotton. At this point, 18 millimoles of hydrogen peroxide were added to initiate reaction.

The reactor was maintained at a temperature of 102° C. for a period of five hours following addition of hydrogen peroxide.

After addition of hydrazine, the redox potential was +115 millivolts and pH was 4.6. After addition of hydrogen peroxide, the redox potential was +175 millivolts and pH was 4.4. At the end of the reaction period, the redox potential was +160 millivolts and the pH was 4.2.

During the reaction, there was no visible latex formation or other indication of bulk polymerization. There was a 94% conversion of the styrene monomer. The slurry was dewatered, washed and dried as described in the previous examples. The product yield was 1195 grams of cotton plus deposited polystyrene. There was a 19.5% addon of polystyrene within/and upon the cotton fibers.

EXAMPLE 15

In this example, polystyrene was deposited into cotton linters using a hydrazine-aluminum complex as the reducing component of the redox catalyst system.

A 1000 g. portion of cotton linters was treated with 20 millimoles of aluminum ion (added as aluminum sulfate) and 17.5 milliequivalents of sulfuric acid to adjust the initial pH. The cotton linters were formed into a 1.85% slurry in distilled water in the stainless steel reactor drum. Next, 307 g. of styrene monomer were added and dispersed in the reaction slurry.

The slurry was then treated with 13 millimoles of hydrazine (as hydrazine hydrate) to form a hydrazine complex with the aluminum which was previously introduced by ion exchange reaction into the cellulose. Then, 17 millimoles of peroxide were added to initiate reaction. The reactor was maintained at a temperature of 97° C. for a period of 2.2 hours following addition of the hydrogen peroxide.

After addition of hydrazine, the redox potential was +130 millivolts and pH was 4.6. After addition of hydrogen peroxide, the redox potential was +190 millivolts and pH was 4.6. At the end of the reaction period, the redox potential was +265 millivolts and pH was 4.2.

During this reaction, there was no visible formation of latex or other indication of bulk polymerization. The slurry was dewatered and the polymer-modified fibers washed and dried as described in the previous examples. There was a 39% conversion of styrene monomer during the reaction. The yield of 1120 g. of polymer deposited fibers was obtained representing a 12% addon based on dry weight of cotton fibers treated.

EXAMPLE 16

In this example, a mixture of ammonia and hydrazine in the form of a complex with ferric ion was used as the reducing component of a redox catalyst system.

A 1000 g. portion of cotton linters was washed, centrifudged, and formed into a 1.85% slurry in water as described in several of the previous examples. To this slurry, there was added four millimoles of ferric ion, as ferric chloride, which was chemically bound to the cotton by ion exchange reaction. At this point, 307 g. of styrene monomer were added and allowed to disperse throughout the reaction mixture.

The slurry was then treated with 20 millimoles of hydrazine and 6.7 millimoles of ammonia to form an ammonia-hydrazine complex with the bound ferric ion. There was also added 33 milliequivalents of sulfuric acid to adjust the initial pH of the reaction mixture. There was then added 17 millimoles of hydrogen peroxide to initiate reaction. The reactor was maintained at a temperature of 97° C. (measured at the top of the reflux condenser) for a period of 3.3 hours following addition of the hydrogen peroxide.

After addition of hydrazine, the redox potential was +195 millivolts and pH was 4.3. After addition of hydrogen peroxide, the redox potential was +250 millivolts and pH was 4.1. At the end of the reaction period, the redox potential was +210 millivolts and pH was 4.1.

In the course of the reaction, there was no visible formation of latex or other indication of bulk polymerization. At the end of the reaction period, the slurry was dewatered and the polymer modified fibers were washed and dried as described in the previous examples. The yield of polymer deposited product was 1185 g., representing the polymer addon of 18.5%. There was a 60% conversion of the styrene monomer during the reaction.

EXAMPLE 17

*Deposition of polystyrene into bleached kraft wood pulp*

Polystyrene was deposited in bleached kraft wood pulp using a hydrazine-hydrogen peroxide, redox catalyst system. The hydrazine was complexed in the pulp with ferric ion which had previously been introduced by ion exchange reaction.

A 1000 g. portion of bleached kraft wood pulp (having an ion exchange capacity of 34 millimoles) was washed and centrifuged as described in the previous examples. The pulp was diluted with distilled water to form a 2.5% slurry. At this point, 266 g. of styrene monomer were added to the reaction slurry. There was then added 10 millimoles of ferric ion, as ferric chloride, and 27.5 milliequivalents of sulfuric acid to adjust the initial pH of the reaction mixture. Then, 25 millimoles of hydrazine, as hydrazine hydrate, were added to the slurry and sufficient time allowed for the ferric ion-hydrazine complex to form and stabilize. Twenty-five millimoles of hydrogen peroxide were then added to initiate reaction.

The reactor was maintained at a temperature of 99° C. for a period of 3.5 hours after addition of the hydrogen peroxide.

After addition of hydrazine, the redox potential was +120 millivolts and pH was 4.6. After addition of hydrogen peroxide, the redox potential was +170 millivolts and pH was 5.0. At the end of the reaction period, the redox potential was +100 millivolts and pH was 6.0.

There was no visible formation of latex or other indication of bulk polymerization during this reaction. There was a monomer conversion of 50%. At the end of the reaction period, the slurry was cooled, dewatered, washed and dried as described for the previous examples. The yield of 1133 g. of pulp and deposited polymer was obtained. There was a 13.3% addon of polystyrene within/ and upon the pulp fibers.

EXAMPLE 18

A 1000 g. portion of bleached kraft wood pulp (having an ion exchange capacity of 34 millimoles) was washed, centrifuged, and diluted with distilled water to form a 1.85% slurry in the stainless steel reactor drum. 525 g. of styrene monomer were added to the reaction slurry. Next, 6.7 millimoles of cadmium ions, as cadmium sulfate, were added and introduced into the pulp by ion exchange reaction. At this point, 20 millimoles of hydrazine, as hydrazine hydrate, were added to the mixture and sufficient time was allowed for the hydrazine cadmium complex to form and stabilize. Next, 33 millimoles of hydrogen peroxide were added to initiate reaction and 33 m. eq. $H_2SO_4$ to adjust the pH. The reactor was maintained at a temperature of 101° C. for a period of 4.8 hours following addition of the hydrogen peroxide.

After addition of hydrazine, the redox potential was 0 and pH was 6.2. After addition of hydrogen peroxide and acid, the redox potential was +205 millivolts and pH was 4.8. The final redox potential was +170 millivolts and pH was 4.4.

There was a 95% conversion of the styrene monomer. There was no visible formation of latex or any other indication of bulk polymerization.

The slurry was dewatered and the polymer-modified fibers were washed and dried as described in the previous examples. There was a yield of 1500 g. of polymer-deposited fibers which represented a 50% polymer addon based on the dry weight of the fibers treated.

Deposition of various polymers into bleached kraft wood pulp using various complex catalyst systems Ion exchanged pulp was prepared by slurrying one kilogram batches of bleached kraft wood pulp in distilled water in a commercial washing machine. A measured amount of the cation exchanged salt was then introduced, equivalent to 20 millimoles of the metal per kilogram of bone dry cellulose. Agitation was continued for one half hour, then the pulp was centrifuged and was stored as wet pulp in a plastic bag under refrigeration. Aliquot parts were then measured out to give the equivalent of 10 grams of bone dry pulp for each subsequent experimental run. Separate batches of pulp were prepared using the following salts: ferric chloride, aluminum sulfate, cupric sulfate, nickel sulfate, nickel ammonium sulfate, ferrous ammonium sulfate, cobalt ammonium sulfate, potassium ferrocyanide, potassium ferricyanide, and silver nitrate. In the several examples listed below, the various pulps are referred to as a pulp which has been treated with the specified salt. This terminology is intended to designate pulp which has had the cation of the specified salt introduced by ion exchange reaction as described above. A series of experiments were carried out in which the following polymers were deposited into kraft wood pulp: styrene, acrylonitrile, methyl methacrylate, ethyl methacrylate, isobutyl methacrylate, ethyl acrylate, acrolein, vinyl acetate, and acrylamide. The monomers which were used in these experiments were obtained from commercial sources and contained a small amount of polymerization inhibitor.

*Experimental conditions*

In order to evaluate the application of this process to the disposition of a large variety of polymers into wood pulps using a large number of different catalyst systems, smaller batches were used so that several could be run at one time. Batches were processed in groups of six, in one-liter Erlenmeyer flasks containing 10 g. of bone-dry cellulose pulp, ion exchanged as described above and slurried in 900 milliliters of water. The Erlenmeyer flask was equipped with a 30″ air-rise tube and a thermometer, to exclude air. Agitation was carried out by hand shaking at frequent intervals, particularly before and after testing, or at the time of addition of reagents. Heating was controlled by use of a laboratory electric hot plate. Redox and pH readings, as used all through this work, were taken at frequent intervals. Redox potential, as used herein, is the uncorrected potential in millivolts, between a platinum and calomel electrode, at room temperature, as read on a Beckman G potentiometer. The pH reading was taken as usual, using a glass and calomel electrode system.

During the initial preparation of the batch, temperature was held at 60° C. until addition of the redox catalyst system was completed, with any required corrections on buffers. There was a progressive change in redox potential, with time, all the way through the reaction, even when no reagents were added. As soon as the catalyst system was completely adjusted, temperature was raised close to reflux and then held there for a two to three hour reaction period. At that point, the batch was cooled, poured through a large Buchner funnel and washed with hot water to remove unreacted materials and any free latex formation. The polymer-modified pulp was then dried in a forced draft oven at 90° C., for eighteen hours to give bone dry yields.

Deposition of polyacrylonitrile into bleached kraft wood pulp

Acrylonitrile is difficult to polymerize and deposit in cellulose. It was found that the particular ion exchange metal used to complex the reducing component of the redox catalyst system was not as critical as the pH range in which the reaction was favorable. The pH had to be held in the range of five to six for effective deposition of polymer into pulp. Ion exchanged pulps that worked particularly well were ones which were treated with ferric chloride, copper sulfate, nickel sulfate, or ferrous ammonium sulfate, or complexed with ammonia or hydrazine.

EXAMPLE 19

A 10 g. portion of ferric chloride treated pulp was slurried in water, as described above mixed with six g. of acrylonitrile monomer, and treated with 2.5 ml. of 0.5% hydrazine hydrate and 2.5 ml. of 0.35% hydrogen peroxide. Additional 2.5 ml. portions of 0.35% hydrogen peroxide were added at two intervals during the course of the reaction.

After addition of hydrazine, the redox potential was +110 mv. and pH was 7.2. After the first addition of $H_2O_2$ the redox potential was +160 mv. and pH was 6.8. After the second addition of $H_2O_2$, the redox potential was +190 mv. and pH was 6.7. At the end of reaction, the redox potential was +220 mv. and pH was 6.4.

The slurry was held at a temperature of 70° C. for a period of three hours, forty minutes, then cooled, dewatered, washed and dried. In this experiment, the product obtained had a 1.5% addon of polyacrylonitrile based on the bone dry weight of pulp treated.

EXAMPLE 20

A ten g. portion of ferric chloride treated pulp was slurried in a flask as described above and treated with 2.5 ml. of 0.35% of ammonium hydroxide and six g. of acrylonitrile monomer. There were then added three 2.5 ml. portions of 0.35% hydrogen peroxide at intervals throughout the reaction period.

The reaction slurry was held at a temperature of 70° C. for a period of three hours, forty minutes. The redox potential and pH were monitored as described above. At the end of the reaction period, the slurry was dewatered, washed, and dried as described above. The product consisted of pulp containing a 1.5% addon of polyacrylonitrile.

EXAMPLE 21

A ten g. portion of ferric chloride treated pulp was formed into a dilute slurry as described above and treated with 5 ml. of 0.5% hydrazine hydrate, 5 ml. of 0.35% ammonium hydroxide, and 10 g. of acrylonitrile monomer. A five ml. portion of 0.35% hydrogen peroxide was added to initiate the reaction. About half way through the reaction period, an additional ten ml. of 0.35% hydrogen peroxide was added along with four ml. of 0.5 N sulfuric acid to adjust the pH.

The slurry was held at temperature of 68° C. for a period of three hours, ten minutes. The redox potential and pH were monitored as described above. At the end of the reaction period, the slurry was dewatered and the pulp washed and dried as described above. The product which was obtained consisted of pulp having a 1.4% addon of polyacrylonitrile.

EXAMPLE 22

A ten g. portion of ferric chloride treated pulp was formed into a dilute slurry as described above and treated with ten ml. of 0.5% hydrazine hydrate and 6.6 g. acrylonitrile monomer. Next, ten ml. of 0.35% hydrogen peroxide was added to initiate reaction, along with two ml. of 0.5 N sulfuric acid to adjust the pH.

The slurry was held at a temperature of 75° C. for a period of three hours, thirty minutes. The redox potential and pH were measured at various intervals.

At the end of the reaction period, the slurry was dewatered and the pulp washed and dried as described above. The product which was obtained consisted of pulp having a 4.5% addon of polyacrylonitrile.

EXAMPLE 23

A ten g. portion of aluminum sulfate treated pulp was formed into a dilute slurry as described above. Then, 2.5 ml. of 0.5% hydrazine hydrate solution were added to form an aluminum-hydrazine complex in the pulp. Six g. of acrylonitrile monomer were then added to the slurry and 2.5 ml. of 0.35% hydrogen peroxide added to initiate reaction. Additional 2.5 ml. portions of 0.35% hydrogen peroxide were added at two intervals during the reaction period. The reaction slurry was held at 70° C. for a period of three hours, forty minutes. During the reaction period, the redox potential and pH were monitored as described above.

At the end of the reaction period, the slurry was dewatered and the pulp washed and dried. The pulp contained a 6% addon of polyacrylonitrile.

EXAMPLES 24 TO 28

In Examples 24 to 28, summarized in Table II below, samples of copper treated and nickel treated pulp were processed in accordance with this invention. The procedure followed was essentially that described in the previous examples. A small portion of pulp was slurried in water, in admixture with the monomer, and treated successively with hydrazine hydrate or ammonium hydroxide and successive quantities of hydrogen peroxide to initiate the polymerization. Redox potential and pH measurements were taken at various intervals through each of the experiments represented by the several examples. In Examples 25 and 28 small amounts of dilute sulfuric acid were added to adjust pH. The specific reaction conditions and results of each of the several examples are set forth in Table II in which the order of addition of reagents and taking of measurements is noted by reading down each column of the appropriate example heading.

TABLE II

| Example No. | 24 | 25 | 26 | 27 | 28 |
|---|---|---|---|---|---|
| | 10 g. ion-exchanged pulp | | | | |
| Exchange Cation | $Cu^{++}$ | $Cu^{++}$ | $Cu^{++}$ | $Ni^{++}$ | $Ni^{++}$ |
| Acrylonitrile Monomer, g | 6 | 10 | 10 | 10 | 10 |
| 0.5 N $H_2SO_4$, ml | | | | | 2 |
| 0.5% Hydrazine Hydrate, ml | 25 | 5 | 10 | 10 | 10 |
| 0.35% $NH_4OH$, ml | | | 1 | | 3 |
| Redox: | | | | | |
| Mv | 70 | 70 | 45 | 90 | 135 |
| pH | 7.8 | 8.2 | 6.8 | 6.8 | 4.7 |
| 0.35% $H_2O_2$, ml | 2.5 | 5 | 10 | 10 | 10 |
| Redox: | | | | | |
| Mv | 120 | 100 | 80 | 150 | 210 |
| pH | 6.9 | 7.6 | 6.6 | 6.6 | 4.7 |
| 0.5% $H_2SO_4$, ml | | 4 | | | |
| 0.35% $H_2O_2$, ml | 2.5 | 10 | 10 | | |
| Redox: | | | | | |
| Mv | 235 | 380 | 200 | | |
| pH | 6.2 | 3.0 | 6.1 | | |
| 0.35% $H_2O_2$, ml | 2.5 | | | | |
| Temp., °C | 70 | 68 | 95 | 95 | 95 |
| React. Time (hr.:Min.) | 3:40 | 3:10 | 2:50 | 4:00 | 4:00 |
| Final Redox: | | | | | |
| Mv | 280 | 400+ | 135 | 165 | 175 |
| pH | 6.0 | 3.3 | 6.2 | 6.3 | 5.7 |
| Percent polymer addon | 6 | 10.1 | 7.2 | 11.6 | 16.0 |

EXAMPLES 29 TO 34

In these examples, polyacrylonitrile was deposited into mixtures of pulp treated with different metal cations. In each example, ten g. samples of pulp were used which consisted of equal quantities of pulp treated with different metal cations. The procedure followed was the same used in the previous examples. The specific reaction condition and quantities of reagents used, together with yield data are set forth in Table III below. In Table III, the sequence of addition of reagents and taking of redox potential and pH measurements is that obtained by reading down each column under the appropriate example headings.

TABLE III

| Example No | 29 | 30 | 31 | 32 | 33 | 34 |
|---|---|---|---|---|---|---|
| | 10 g. pulp | | | | | |
| Exchange Cation | Ni/Cu | Ni/Al | Ni/Fe | Al/Cu | Fe/Cu | Fe/Al |
| Acrylonitrile Monomer, g | 10 | 10 | 10 | 10 | 10 | 1 |
| 0.35% NH$_4$OH, ml | 3 | 3 | 3 | 3 | 3 | 3 |
| 0.5 N H$_2$SO$_4$, ml | 2 | 2 | 2 | 2 | 2 | 2 |
| 0.5% Hydrazine Hydrate, ml | 5 | 5 | 5 | 5 | 5 | 5 |
| Redox: | | | | | | |
| Mv | 35 | 70 | 110 | 85 | 25 | 55 |
| pH | 6.1 | 5.4 | 4.8 | 4.8 | 5.6 | 5.2 |
| 0.35% H$_2$O$_2$, ml | 10 | 10 | 10 | 10 | 10 | 10 |
| Redox: | | | | | | |
| Mv | 125 | 135 | 140 | 85 | 90 | 150 |
| pH | 4.9 | 5.5 | 5.4 | 5.5 | 5.4 | 5.4 |
| 0.35% H$_2$O$_2$, ml | 10 | 10 | 10 | 10 | 10 | 10 |
| Redox: | | | | | | |
| Mv | 155 | 200 | 210 | 175 | 140 | 190 |
| pH | 5.5 | 5.3 | 5.2 | 5.2 | 5.3 | 5.2 |
| Temp., °C | 98 | 98 | 98 | 98 | 98 | 98 |
| React. Time (Hr.: min.) | 4:30 | 4:30 | 4:30 | 4:30 | 4:30 | 4:30 |
| Final Redox: | | | | | | |
| Mv | 130 | 150 | 145 | 135 | 110 | 115 |
| pH | 5.2 | 6.2 | 6.3 | 5.9 | 5.8 | 6.2 |
| Percent polymer addon | 12.1 | 10.5 | 13.1 | 8.4 | 7.7 | 10.1 |

*Deposition of polymethylmethacrylate into bleached kraft wood pulp*

Methyl methacrylate is easily polymerized and deposited into wood pulp. Polymer addons of up to 65% and higher were obtained in many cases. Hydrazine-peroxide and ammonia-peroxide redox catalyst systems were used successfully, with the reducing component being complexed with a metal ion bound by ion exchange to the wood pulp. Generally, the reaction conditions were more significant than the ion exchanged metal in the pulp used to complex the reducing catalyst component. Best results were obtained starting at a pH in the range of about 7 to 8 and finishing at a pH of about 5.

EXAMPLES 35–48

In these examples, a series of experiments were carried out in which methyl methacrylate was polymerized and deposited into bleached kraft wood pulp. The procedures used were essentially those followed in the previous examples using small batches of pulp. In these experiments, 10-gram batches of bleached kraft wood pulp treated with various salts to deposit metallic cations by ion exchange reaction were used to complex hydrazine or ammonia as the reducing component of a redox catalyst couple. The wood pulp samples were taken from the larger batches prepared in accordance with the procedure described just prior to Example 19. The wood pulp samples were treated with hydrazine or ammonia to form a complex of the reducing catalyst component in a dilute slurry as described in the previous examples. Next, the methyl methacrylate monomer was mixed with the pulp slurry and a small amount of hydrogen peroxide added to initiate reaction. In some cases, small amounts of sulfuric acid were added to adjust the pH of the reaction mixture.

Redox measurements in millivolts and pH measurements were made at various times throughout the course of the reaction to obtain standard values for control when the process is carried out in a continuous reactor. The slurry was generally held at a temperature in the range of about 70 to 100° C. for a period of two to five hours. At the end of the reaction time, the slurry was dewatered, the pulp washed and dried. Yield measurements were then made on dried pulp and reported as percent of polymer addon based on the bone dry pulp treated.

The specific reaction conditions, reagents used, and results obtained are set forth below in Table IV for Examples 35 to 48. The sequence of addition of various reagents and of the taking of various measurements of reaction conditions is noted by reading down each column of the table under the appropriate example heading.

TABLE IV.—DEPOSITION OF POLY(METHYLMETHACRYLATE) INTO PULP

| Example No | 35 | 36 | 37 | 38 | 38a | 38b | 39 |
|---|---|---|---|---|---|---|---|
| Ion-exchanged pulp, g | 10 | 10 | 10 | 10 | 10 | 10 | 10 |
| Exchange ion | Fe$^{+++}$ | Al | Cu | Ni | Ni | Ni | Fe/Ni |
| MMA monomer, g | 10 | 10 | 10 | 10 | 5 | 5 | 10 |
| 0.5% hydrazine hydrate, ml | 10 | 10 | 10 | 10 | 5 | 10 | 10 |
| 0.5 N H$_2$SO$_4$, ml | 1 | 1 | 1 | 1 | 1.5 | 2.5 | 1 |
| 0.5% NH$_4$OH, ml | | | | | | | |
| Redox: | | | | | | | |
| Mv | −70 | −80 | −70 | −70 | −65 | −75 | −100 |
| pH | 7.4 | 7.7 | 7.6 | 7.8 | 7.1 | 7.3 | 8.0 |
| 0.35% H$_2$O$_2$, ml | 10 | 10 | 10 | 10 | 10 | 10 | 10 |
| 0.35% NH$_4$OH, ml | | | | | 0.5 | 0.5 | |
| 0.5 N H$_2$SO$_4$, ml | | | | | | | |
| Redox: | | | | | | | |
| Mv | 35 | 0 | 0 | 10 | 285 | 190 | −15 |
| pH | 7.0 | 7.5 | 6.8 | 7.5 | 4.3 | 5.4 | 7.8 |
| 0.35% H$_2$O$_2$, ml | | | | | 2.5 | 2.0 | |
| 0.5% NH$_4$OH | | | | | | | |
| Temp., °C | 99 | 99 | 99 | 99 | 100 | 100 | 99 |
| React. Time (hr.: min.) | 5:30 | 5:30 | 5:30 | 5:30 | 3:40 | 3:40 | 5:30 |
| Final Redox: | | | | | | | |
| Mv | −30 | 10 | 55 | 50 | 220 | 200 | 15 |
| pH | 6.7 | 4.9 | 4.9 | 5.4 | 3.8 | 3.9 | 5.6 |
| Percent polymer addon | 34.8 | 35.6 | 29.1 | 40.8 | 31.7 | 43.7 | 10.7 |

TABLE IV.—DEPOSITION OF POLY(METHYLMETHACRYLATE) INTO PULP—Continued

| Example No. | 40 | 41 | 42 | 43 | 44 |
|---|---|---|---|---|---|
| Ion-exchanged pulp, g | 10 | 10 | 10 | 10 | 10 |
| Exchange ion | Al/Ni | Cu | Ni | $Fe^{+++}$ | Al |
| MMA monomer, g | 10 | 10 | 10 | 10 | 10 |
| 0.5% Hydrazine hydrate, ml | 10 | | | | |
| 0.5 N $H_2SO_4$, ml | 1 | | | | |
| 0.5% $NH_4OH$, ml | | 5 | 5 | 5 | 5 |
| Redox: | | | | | |
| Mv | −80 | 150 | 100 | 260 | 220 |
| pH | 7.8 | 7.5 | 8.2 | 7.0 | 8.1 |
| 0.35% $H_2O_2$, ml | 10 | 10 | 10 | 20 | 20 |
| 0.35% $NH_4OH$, ml | | | | | |
| 0.5 N $H_2SO_4$, ml | | | | | |
| Redox: | | | | | |
| Mv | 10 | 275 | 210 | 315 | 250 |
| pH | 7.8 | 6.4 | 7.3 | 6.2 | 7.1 |
| 0.35% $H_2O_2$, ml | | 5 | 51 | | 15 |
| 0.5% $NH_4OH$ | | | | | |
| Temp., °C | 99 | 100 | 100 | 99 | 99 |
| React. Time (hr.: min.) | 5:30 | 3:25 | 3:25 | 4:20 | 4:20 |
| Final Redox: | | | | | |
| Mv | 25 | 290 | 280 | 360 | 340 |
| pH | 5.2 | 5.4 | 6.0 | 6.0 | 5.5 |
| Percent polymer addon | 21.7 | 71.8 | 58.1 | 49.6 | 63.1 |

| Example No. | 45 | 46 | 46a | 47 | 48 |
|---|---|---|---|---|---|
| Ion-exchange pulp, g | 10 | 10 | 10 | 10 | 10 |
| Exchange ion | [1] Ni | [2] $Fe^{++}$ | [3] $Fe^{++}$ | [4] Co | Ag |
| MMA monomer, g | 10 | 10 | 10 | 10 | [1] 10 |
| 0.5% Hydrazine hydrate, ml | 10 | 10 | 10 | 10 | 10 |
| 0.5 N $H_2SO_4$, ml | | | | | |
| 0.5% $NH_4OH$, ml | | | | | |
| Redox: | | | | | |
| Mv | 35 | −35 | −40 | 10 | −25 |
| pH | 7.1 | 7.8 | 7.8 | 7.3 | 7.4 |
| 0.35% $H_2O_2$, ml | 10 | 10 | 10 | 10 | 10 |
| 0.35% $NH_4OH$, ml | | | | | |
| 0.5 N $H_2SO_4$, ml | 0.2 | 0.2 | 0.2 | 0.2 | 0.2 |
| Redox: | | | | | |
| Mv | 100 | 150 | 100 | 110 | 180 |
| pH | 6.9 | 5.2 | 6.4 | 6.7 | 6.6 |
| 0.35% $H_2O_2$, ml | 5 | 5 | 5 | 5 | 5 |
| 0.5% $NH_4OH$ | | | | | |
| Temp., °C | 89 | 89 | 89 | 89 | 89 |
| React. Time (hr.: min.) | 4:20 | 4:20 | 4:20 | 4:20 | 4:20 |
| Final Redox: | | | | | |
| Mv | 230 | 250 | 260 | 270 | 370 |
| pH | 5.5 | 4.3 | 5.3 | 4.8 | 5.0 |
| Percent polymer addon | 70.0 | 66.0 | 68.0 | 68.0 | 59.0 |

[1] $Ni(NH_4)_2(SO_4)_2 \cdot 6H_2O$
[2] $Fe(NH_4)_2(SO_4)_2 \cdot 6H_2O$
[3] $K_4Fe(CN)_6 \cdot 3H_2O$
[4] $Co(NH_4)_2(SO_4)_2 \cdot 6H_2O$

*Deposition of polystyrene into bleached kraft pulp*

A number of experiments were carried out, as set forth in the following examples, in which styrene was polymerized and deposited into bleached kraft pulp using various catalyst systems. The procedure followed was essentially that described for the previous examples.

Small (10 g.) batches of ion-exchanged pulp from the large batches described just prior to Example 19 were diluted in 900 ml. water to form a dilute slurry. Ammonia, hydrazine, or urea were added to form a complex with ion which had been introduced into the pulp by ion exchange reaction. The complex which was thus formed constituted the reducing component of a redox catalyst couple. The styrene monomer was then added to the mixture and hydrogen peroxide added to initiate reaction.

Redox potential and pH measurements were made periodically throughout the course of the reaction. Additional amounts of the reducing catalyst component or of the hydrogen peroxide were added in certain cases where the redox potential or pH measurements indicated desirability of so doing. In some cases, small amounts of acid or base were added to control the pH of the reaction system.

At the end of the reaction period, the slurry was dewatered and the pulp washed and dried. Measurements were then made to determine the yield expressed as percent addon of deposited polymer based on dry weight of pulp treated.

EXAMPLES 49 TO 56

The experiments just described, in which polystyrene was deposited into bleached kraft pulp, are tabulated below in Table V. The table lists the reaction conditions and the order and amounts of the reagents used at various times throughout the several experiments, together with the yield data for the experiments. As in the previous tables, the columns under each example heading are read downward to follow the order of addition of reagents and the order of taking of redox and pH measurements with time.

TABLE V.—DEPOSITION OF POLYSTYRENE INTO PULP

[10 g. batches of ion-exchanged pulp]

| Example No | 49 | 49a | 49b | 50 | 50a | 51 | 51a |
|---|---|---|---|---|---|---|---|
| Exchange Ion | Cu | Cu | Cu | Ni | Ni | Ni | Ni |
| Styrene monomer, g | 10 | 10 | 10 | 10 | 10 | 5 | 5 |
| 0.6% Urea, ml | | | | | | | 3 |
| 0.35% NH₄OH, ml | | | 3 | | 3 | | 10 |
| 0.5% Hydrazine hydrate, ml | 10 | 10 | 10 | 10 | 10 | 10 | 3.0 |
| 0.5 N H₂SO₄, ml | | 1 | | | | 1.5 | |
| Redox: | | | | | | | |
| Mv | −135 | −30 | −115 | −195 | −140 | −80 | −20 |
| pH | 8.3 | 7.4 | 9.2 | 9.0 | 8.5 | 7.6 | 6.8 |
| 0.5% Hydrazine hydrate, ml | | | | | | | |
| Redox: | | | | | | | |
| Mv | | | | | | | |
| pH | | | | | | | |
| 0.35% H₂O₂, ml | 10 | 10 | 10 | 10 | 10 | 10 | 10 |
| Redox: | | | | | | | |
| Mv | −20 | +60 | −60 | −75 | −90 | +150 | +275 |
| pH | 7.7 | 5.8 | 8.7 | 8.7 | 8.4 | 5.7 | 3.9 |
| 0.5 N H₂SO₄, ml | | | | 1 | 1 | 1 | |
| 0.35% H₂O₂, ml | | | | 10 | 10 | 10 | |
| Redox: | | | | | | | |
| Mv | | | | +60 | +125 | +150 | +285 |
| pH | | | | 6.9 | 6.2 | 5.8 | 3.8 |
| Temp., °C | 97 | 97 | 97 | 98 | 98 | 95 | 95 |
| React. Time (hr.: min.) | 3:15 | 3:15 | 3:15 | 4:00 | 4:00 | 3:30 | 3:30 |
| Final Redox: | | | | | | | |
| Mv | +55 | +70 | −45 | +110 | +140 | +185 | +260 |
| pH | 6.6 | 5.6 | 8.6 | 5.1 | 4.2 | 3.6 | 3.4 |
| Percent polymer addon | 7.8 | 11.0 | 11.0 | 34.1 | 45.4 | 29.0 | 20.2 |

| Example No | 51b | 52 | 53 | 54 | 55 | 56 |
|---|---|---|---|---|---|---|
| Exchange Ion | Ni | Ni(NH₄) | Co⁺⁺(NH₄) | Fe⁺⁺(CN) | Fe⁺⁺⁺(CN) | Ag |
| Styrene monomer, g | 5 | 10 | 10 | 10 | 10 | 10 |
| 0.6% Urea, ml | 3 | | | | | |
| 0.35% NH₄OH, ml | 10 | 10 | 10 | 10 | 10 | 10 |
| 0.5% Hydrazine hydrate, ml | 3.0 | 1 | 1 | 1 | 1 | 1 |
| 0.5 N H₂SO₄, ml | | | | | | |
| Redox: | | | | | | |
| Mv | −70 | 140 | 165 | 200 | 160 | 305 |
| pH | 7.4 | 5.2 | 4.6 | 4.0 | 4.8 | 4.0 |
| | | 5 | 5 | 5 | 5 | 5 |
| 0.5% Hydrazine hydrate, ml | | | | | | |
| Redox: | | | | | | |
| Mv | | 85 | 110 | 135 | 90 | 85 |
| pH | | 6.1 | 4.8 | 4.5 | 5.5 | 5.6 |
| 0.35% H₂O₂, ml | 10 | 10 | 10 | 10 | 10 | 10 |
| Redox: | | | | | | |
| Mv | +270 | 170 | 185 | 185 | 205 | 230 |
| pH | 4.0 | 5.1 | 4.6 | 4.6 | 4.3 | 5.1 |
| 0.5 N H₂SO₄, ml | | | | | | |
| 0.35% H₂O₂, ml | | | | | | |
| Redox: | | | | | | |
| Mv | +270 | | | | | |
| pH | 3.9 | | | | | |
| Temp., °C | 95 | 94 | 94 | 94 | 94 | 94 |
| React. Time (hr.:min.) | 3:30 | 3:00 | 3:00 | 3:00 | 3:00 | 3:00 |
| Final Redox: | | | | | | |
| Mv | +260 | 215 | 215 | 210 | 210 | 290 |
| pH | 3.6 | 4.4 | 4.2 | 4.2 | 4.0 | 4.2 |
| Percent polymer addon | 26.0 | 21.0 | 33.5 | 22.0 | 27.0 | 10.0 |

*Deposition of polyvinyl acetate into bleached kraft pulp*

The series of experiments were carried out, as set forth in the following examples, in which vinyl acetate was polymerized and deposited into kraft wood pulp. In these examples, small samples of ion exchanged pulp prepared as described just prior to Example 19 were used in the hose material for deposition of polyvinyl acetate. Hydrazine or ammonia was complexed with the metal ion previously introduced into the pulp by ion exchange reaction and hydrogen peroxide used as the oxidizing component of the catalyst system. The complexed hydrazine-hydrogen peroxide catalyst system worked especially well for pulps which had been treated with ferric chloride, aluminum sulfate, copper sulfate, and nickel sulfate, respectively. The complexed ammonia-hydrogen peroxide catalyst system worked especially well for pulp which had been treated with nickel sulfate.

In these examples, 10 g. portions of pulp were treated with ammonia or hydrazine to form a reducing complex with the bound metal ion in the pulp. Additional amounts of base or acid were added where needed to adjust the pH of the reaction system. The treatment was carried out using a dilute slurry of the wood pulp to which there was added 10 g. of the vinyl acetate monomer and dilute hydrogen peroxide to initiate polymerization. Redox potential and pH measurements were taken at several intervals during the reaction period to determine desirable levels at various stages of the reaction. The reaction was carried out at a temperature of about 95–96° C. for a period of approximately four hours.

EXAMPLES 57 TO 61

The deposition of polyvinyl acetate into bleached wood pulp was carried out following the procedure just described with the results set forth in Table VI below. In Table VI, the quantities and order of addition of reagents are noted reading down each column under the appropriate example number. In each of the columns, the values are also set forth for redox potential and pH measurements made at various intervals throughout the reaction.

TABLE VI.—DEPOSITION OF POLYVINYLACETATE INTO PULP

| Example No. | 57 | 58 | 59 | 60 | 61 |
|---|---|---|---|---|---|
| | \multicolumn{5}{c}{10 g. pulp} | | | | |
| Exchange Ion | Fe$^{+++}$ | Fe$^{+++}$ | Al | Cu | Ni |
| 0.35% NH$_4$OH, ml | 2.5 | | | | |
| 0.5 N H$_2$SO$_4$, ml | 2.5 | | | | |
| 0.5% Hydrazine hydrate, ml | 10 | 0.5 | 0.5 | 0.5 | 0.5 |
| Redox: | | | | | |
| Mv | 220 | 100 | 85 | 110 | 100 |
| pH | 3.9 | 5.8 | 5.8 | 5.5 | 5.6 |
| Monomers, g | 10 | 10 | 10 | 10 | 10 |
| 0.35% H$_2$O$_2$, ml | 10 | 10 | 10 | 10 | 10 |
| Redox: | | | | | |
| Mv | 340 | 315 | 310 | 330 | 355 |
| pH | 3.8 | 5.1 | 5.0 | 5.0 | 4.8 |
| 0.35% NH$_4$OH, ml | 5 | | | | |
| Final Redox: | | | | | |
| Mv | 260 | 215 | 235 | 240 | 240 |
| pH | 3.4 | 3.8 | 3.8 | 3.8 | 3.8 |
| Temp., °C | 95 | 96 | 96 | 96 | 96 |
| React. Time (hr.: min.) | 4:00 | 4:20 | 4:20 | 4:20 | 4:20 |
| Percent polymer addon | 25.5 | 37.1 | 21.2 | 23.6 | 30.5 |

Deposition of polyacrylamide into bleached kraft wood pulp

The polymerization and deposition of acrylamide into wood pulp was carried out with great difficulty. The best results were obtained with pulps which had been treated with aluminum sulfate, copper sulfate, and nickel sulfate, respectively. Ammonia was complexed with the bound metal ions; acrylamide monomer, and hydrogen peroxide added to initiate polymerization. The best results were obtained at relatively high pH starting at a pH of about 8.5 and finishing at a pH of 8.9 at the end of the reaction. Under these conditions, the catalyst system was not exhausted and the reaction could be carried on almost indefinitely. The data indicated that a longer reaction time would raise the product yield.

EXAMPLES 62 to 64

In these examples, polyacrylamide was deposited into kraft wood pulp using the same procedure described in the previous examples. In this process, 10 g. portions of pulp were diluted with water to form very dilute slurries and treated with ammonia to form a complex of the reducing catalyst component. Acrylamide monomer and hydrogen peroxide were then added to the reaction mixture. The slurry was held at a temperature of about 100° C. for a period of approximately four hours. Redox potential and pH measurements were made at several intervals during the process and additional quantities of hydrogen peroxide were added at one point. At the end of the reaction period, the slurry was dewatered and the product washed and dried as in the previous examples. Yield measurements were made showing polymer addons in the range of about 3 to 5%. The details of the reaction conditions, quantity and order of addition of reagents, and redox potential and pH measurements, together with yield data for each example are set forth in Table VII below. Each of the examples in the table should be read down each column to follow the order of addition of reagents and the order of redox potential and pH measurements.

TABLE VII.—DEPOSITION OF POLYACRYLAMIDE INTO PULP

| Example No. | 62 | 63 | 64 |
|---|---|---|---|
| | \multicolumn{3}{c}{10 g. pulp} | | |
| Exchange Ion | Cu | Ni | Al |
| 0.35% NH$_4$OH, ml | 5 | 5 | 5 |
| Monomer, g | 10 | 10 | 10 |
| Redox: | | | |
| Mv | 100 | 95 | 200 |
| pH | 8.4 | 8.7 | 8.5 |
| 0.35% H$_2$O$_2$, ml | 10 | 10 | 10 |
| Redox: | | | |
| Mv | 175 | 175 | 190 |
| pH | 8.4 | 8.6 | 8.1 |
| 0.35% H$_2$O$_2$, ml | 15 | 60 | 60 |
| Redox: | | | |
| Mv | 285 | 185 | 290 |
| pH | 6.8 | 7.8 | 7.6 |
| Temp., °C | 100 | 100 | 99 |
| React. Time (hr.: min.) | 4:00 | 4:00 | 4:20 |
| Final redox: | | | |
| MV | 95 | 160 | 175 |
| pH | 7.4 | 8.5 | 8.2 |
| Percent polymer addon | 3.1 | 3.8 | 5.0 |

Deposition of polyacrolein into bleached wood pulp

Acrolein is used infrequently in polymerization processes because of the relative inertness of the material. Acrolein, however, is cheap and offers the incentive that oxidation of the deposited polymer can give a polyacrylic acid addon. In the several examples demonstrating the deposition of polyacrolein into pulp, the best polymer addons were of the order of 5%. The best results were obtained using pulp which had been treated with copper sulfate or nickel sulfate having hydrazine complexed therewith as the reducing component of the catalyst system. The most favorable results were obtained using reaction systems starting at a pH of about 6.8 and ending at about 3–5.

EXAMPLES 65 and 66

In these examples, 10 g. portions of ion exchanged pulp were diluted with water to form a dilute slurry, treated with hydrazine, acrolein monomer, and hydrogen peroxide to polymerize and deposit polyacrolein within the pulp. In these examples, the pH of the reaction system was adjusted by addition of small amounts of dilute acid and additional quantities of hydrogen peroxide were added where needed. Measurements were made of redox potential and pH at various intervals throughout the reaction period. The reaction was carried out at a temperature of about 99° C. for a period of three hours, fifty minutes. The slurry was dewatered at the end of the reaction period and the pulp washed and dried. Yield measurements indicated a polymer addon ranging from 5.3 to 6.7%.

The specific reaction conditions used and the order of addition of reagents and the taking of redox potential and pH measurements is indicated below in Table VIII. In this table, as in the previous tables, the order of addition of reagents and the order of measurements of pH and redox potential are noted by reading down each column under the appropriate example heading.

TABLE VIII.—DEPOSITION OF POLYACROLEIN INTO PULP

| Example No. | 65 | 65a | 66 |
|---|---|---|---|
| | | 10 g. pulp | |
| Exchange Ion | Cu | Cu | Ni |
| 0.5 N $H_2SO_4$, ml | | 3 | 3 |
| 0.5% Hydrazine hydrate, ml | 10 | 10 | 10 |
| Redox: | | | |
| Mv | −190 | −10 | −125 |
| pH | 9.1 | 6.2 | 7.8 |
| Monomer, g | 10 | 10 | 10 |
| Redox: | | | |
| Mv | −50 | +120 | +80 |
| pH | 9.2 | 4.8 | 6.5 |
| 0.35% $H_2O_2$, ml | 10 | 10 | 10 |
| 0.5 N $H_2SO_4$, ml | | | 1.0 |
| Redox: | | | |
| Mv | +180 | +260 | +330 |
| pH | 6.4 | 5.2 | 3.7 |
| 0.35% $H_2O_2$, ml | 3 | | |
| Redox: | | | |
| Mv | +225 | +300 | +325 |
| pH | 5.9 | 4.7 | 3.6 |
| Temp., °C | 99 | 99 | 99 |
| React. Time (hr.:min.) | 3:50 | 3:50 | 3:50 |
| Final redox: | | | |
| Mv | +60 | +110 | +135 |
| pH | 5.4 | 3.8 | 3.3 |
| Percent polymer addon | 5.3 | 6.7 | 6.7 |

*Deposition of poly(ethylacrylate) into bleached wood pulp*

Ethyl acrylate was found to polymerize and deposit into wood pulp at relatively high polymer addons. Several experiments were carried out using samples of pulp which had been treated with various metal salts. Hydrazine or ammonia was complexed with the metal ion which had been previously introduced into the pulp by ion exchange reaction. The pulp was formed into a dilute slurry, treated with ammonia or hydrazine; the ethyl acrylate monomer, and hydrogen peroxide to initiate reaction. Dilute acid was added to adjust the pH of the reaction mixture. As in the previous examples, redox potential and pH measurements were made repeatedly throughout the reaction time.

EXAMPLES 67–69

In these examples, as set forth in Table IX below, 10 g. portions of ion exchanged pulp were formed into a slurry and treated with ammonia or hydrazine, ethyl acrylate monomer, and hydrogen peroxide. Where necessary, additional amounts of hydrogen peroxide were added during the reaction period. The reaction was carried out at a temperature of 96° C. for a period of four hours, thirty minutes. Redox potential and pH measurements were made repeatedly throughout the reaction period. At the end of the experiments, the slurry was dewatered and the pulp washed and dried. Yield measurements indicated polymer addons ranging from about 40–60%.

The specific reaction conditions and order and quantity of reagents used and measurements taken are indicated in Table IX below. As in the other tables, the order of addition of reagents and of taking the measurements is noted by reading down each column under the appropriate example heading.

TABLE IX.—DEPOSITION OF POLY(ETHYLACRYLATE) INTO PULP

| Example No. | 67 | 67a | 68 | 68a | 69 |
|---|---|---|---|---|---|
| | | | 10 g. pulp | | |
| Exchange Ion | $Fe^{+++}$ | $Fe^{+++}$ | Al | Al | Ni |
| 0.35% $NH_4OH$, ml | | 5 | | 5 | 5 |
| 0.5 N $H_2SO_4$, ml | 0.3 | 0.3 | 0.3 | 0.3 | 0.3 |
| 0.5% Hydrazine hydrate, ml | 10 | | 10 | | |
| Redox: | | | | | |
| Mv | −60 | −70 | −110 | −80 | −80 |
| pH | 7.6 | 8.4 | 8.3 | 8.5 | 8.3 |
| Monomer, g | 10 | 10 | 10 | 10 | 10 |
| Redox: | | | | | |
| Mv | +50 | +35 | +35 | +30 | +20 |
| pH | 6.6 | 7.3 | 6.9 | 7.6 | 7.4 |
| 0.35% $H_2O_2$, ml | 10 | 10 | 10 | 10 | 10 |
| Redox: | | | | | |
| Mv | +165 | +250 | +170 | +240 | +180 |
| pH | 6.5 | 6.8 | 6.6 | 7.1 | 6.8 |
| 0.35% $H_2O_2$, ml | 10 | 5 | 10 | 5 | 5 |
| Redox: | | | | | |
| Mv | +200 | +265 | +185 | +250 | +240 |
| pH | 6.4 | 6.5 | 6.4 | 6.6 | 6.7 |
| Temp., °C | 96 | 96 | 96 | 96 | 96 |
| React. Time (hr.:min.) | 4:30 | 4:30 | 4:30 | 4:30 | 4:30 |
| Final redox: | | | | | |
| Mv | +300 | +310 | +340 | +375 | +380 |
| pH | 4.9 | 4.8 | 4.8 | 4.9 | 4.9 |
| Percent polymer addon | 62.4 | 43.1 | 41.4 | 39.3 | 48.7 |

*Deposition of poly(ethylmethacrylate) into bleached wood pulp*

Ethyl methacrylate was found to be polymerized and deposited into wood pulp in excellent yields using both ammoniahydrogen peroxide and hydrazine-hydrogen peroxide catalyst systems, using pulp which had been treated with ferric chloride, aluminum sulfate, or nickel sulfate. The reaction has been found to proceed best, starting with a neutral to slightly basic pH and ending with a slightly acid pH.

EXAMPLES 70–75

In these examples, 10 g. portions of pulp which had been treated with ferric chloride, aluminum sulfate, or nickel sulfate were formed into dilute slurries and complexed with ammonia or hydrazine. Next, ethyl methacrylate monomer and then hydrogen peroxide were added to initiate reaction. Redox potential and pH measurements were made repeatedly throughout the reaction period and additional hydrogen peroxide was added where indicated. The reaction was carried out at a temperature of 98° C. for a period of about four hours. Under the most favorable conditions, polymer addons ranging from about 50 to 75% were obtained.

The specific reaction conditions and order of addition of reagents and taking of redox potential and pH measurements is set forth below in Table X. As in the other tables, the order of addition of reagents and order of taking of pH and redox potential measurements is noted by reading down the column on each of the appropriate examples.

*Deposition of poly(isobutylemethacrylate) into bleached kraft wood pulp*

A series of experiments were carried out in which isobutylmethacrylate was polymerized and deposited into bleached kraft wood plup. This monomer polymerizes readily and under favorable conditions is deposited into wood pulp at polymer addons in excess of 50%. Ammonia or hydrazine was complexed with various metal ions which had been introduced into the pulp by ion exchange reaction and used as the reducing component of the redox catalyst system. Best results were obtained starting with a neutral to slightly basic pH and ending with a slightly acid pH.

EXAMPLES 76–80

In these examples, 10 g. portions of bleached kraft wood pulp which had been treated with ferric chloride, aluminum sulfate, or nickel sulfate were formed into dilute slurries and treated with hydrazine or ammonia to form a complex of the catalyst reducing component. The system was adjusted to a more nearly neutral pH by addition of a small amount of dilute acid. Next, the isobutylmethacrylate monomer and then hydrogen peroxide were added to initiate polymerization. Redox potential and pH measurements were taken at various intervals throughout the reaction period and additional allowance of hydrogen peroxide were added where indicated. The reaction was carried out at a temperature of 97° C. for a period of about four hours.

Details of these examples, including the order of addi-

TABLE X.—DEPOSITION OF POLY(ETHYLMETHACRYLATE) INTO PULP

| Example No | 70 | 71 | 72 | 73 | 74 | 75 |
|---|---|---|---|---|---|---|
| | 10 g. pulp | | | | | |
| Exchange Ion | $Fe^{+++}$ | $Fe^{+++}$ | Al | Al | Ni | Ni |
| 0.35% NH$_4$OH, ml | | 5 | | 5 | | 5 |
| 0.5 N H$_2$SO$_4$, ml | 0.3 | 0.3 | 0.3 | 0.3 | | |
| 0.5% Hydrazine hydrate, ml | 10 | | 10 | | 0.3 | 0.3 |
| Redox: | | | | | 10 | |
| Mv | −100 | −100 | −75 | −95 | −85 | −85 |
| pH | 7.3 | 8.8 | 7.9 | 8.5 | 7.9 | 8.6 |
| Monomer, g | 10 | 10 | 10 | 10 | 10 | 10 |
| Redox: | | | | | | |
| Mv | −25 | −40 | −60 | −45 | −40 | −40 |
| pH | 7.2 | 8.2 | 7.6 | 8.2 | 7.4 | 8.1 |
| 0.35% H$_2$O$_2$, ml | 10 | 10 | 10 | 10 | 10 | 10 |
| Redox: | | | | | | |
| Mv | +60 | +170 | −15 | 120 | 0 | +175 |
| pH | 6.9 | 7.6 | 7.3 | 7.6 | 7.2 | 7.4 |
| 0.35% H$_2$O$_2$, ml | 10 | 5 | 10 | 5 | 10 | 5 |
| Redox: | | | | | | |
| Mv | +150 | +230 | +135 | +220 | +150 | +230 |
| pH | 6.4 | 6.8 | 6.5 | 6.9 | 6.4 | 6.8 |
| Temp., °C | 98 | 98 | 98 | 98 | 98 | 98 |
| React. Time (hr.:min.) | 4:15 | 4:15 | 4:15 | 4:15 | 4:15 | 4:15 |
| Final redox: | | | | | | |
| Mv | +235 | +235 | +285 | +285 | +320 | +320 |
| pH | 6.2 | 6.2 | 5.6 | 6.3 | 6.2 | 6.0 |
| Percent polymer addon | 65.2 | 20.5 | 64.6 | 50.6 | 76.8 | 52.5 |

TABLE XI.—DEPOSITION OF POLY(ISOBUTYLMETHACRYLATE) INTO PULP

| Example No | 76 | 77 | 78 | 79 | 80 |
|---|---|---|---|---|---|
| | 10 g. pulp | | | | |
| Exchange Ion | $Fe^{+++}$ | Al | Al | Ni | Ni |
| 0.35% NH$_4$OH, ml | | | 5 | | 5 |
| 0.5 N H$_2$SO$_4$, ml | 0.3 | 0.3 | 0.3 | 0.3 | 0.3 |
| 0.5% Hydrazine hydrate, ml | 10 | 10 | | 10 | |
| Monomer, g | 10 | 10 | 10 | 10 | 10 |
| Redox: | | | | | |
| Mv | −70 | −70 | −65 | −70 | −75 |
| pH | 7.1 | 7.3 | 7.9 | 7.6 | 8.2 |
| 0.35% H$_2$O$_2$, ml | 10 | 10 | 10 | 10 | 10 |
| Redox: | | | | | |
| Mv | +50 | −20 | +160 | +30 | +85 |
| pH | 7.2 | 7.7 | 8.1 | 7.7 | 8.3 |
| 0.35% H$_2$O$_2$, ml | 10 | 20 | 3 | 15 | 5 |
| Redox: | | | | | |
| Mv | +210 | +135 | +190 | +160 | +200 |
| pH | 6.6 | 7.0 | 7.6 | 7.0 | 7.6 |
| Temp., °C | 97 | 97 | 97 | 97 | 97 |
| React. Time (hr.:min.) | 4:00 | 4:00 | 4:00 | 4:00 | 4:00 |
| Final redox: | | | | | |
| Mv | +250 | +330 | +275 | +350 | +330 |
| pH | 5.6 | 5.8 | 6.8 | 5.7 | 6.3 |
| Percent polymer addon | 51.0 | 65.6 | 25.7 | 54.0 | 34.6 | tion of reagents and of taking of redox potential and pH measurements are set forth above in Table XI.

In the above table, the order of addition of reagents and of taking of redox potential and pH measurements is noted by reading down each column under the appropriate example numbers. At the end of the reaction period, the slurry was dewatered and the pulp washed and dried as in the previous examples. Yield measurements were made with the polymer addon values obtained as indicated in Table XI above.

*Deposition of poly(laurylmethacrylate) into bleached wood pulp*

A series of experiments were carried out in which lauryl methacrylate was polymerized and deposited into bleached kraft wood pulp. This monomer gave a rather meager addon. The experiments were carried out using ammonia or hydrazine complexed with ferric, aluminum, or nickel ions which had been introduced into the pulp by ion exchange reaction. The best results were obtained using a pH that was slightly alkaline at the start.

EXAMPLES 81–86

In these examples, 10 g. portions of bleached kraft wood pulp which had been treated with ferric chloride, aluminum sulfate, or nickel sulfate to introduce metal ions by ion exchange reaction were formed into dilute slurries and treated with ammonia or hydrazine to form a complex of the reducing catalyst component. Next, the lauryl methacrylate monomer and then hydrogen peroxide were added to initiate polymerization. Redox potential and pH measurements were taken at various intervals throughout the reaction period and additional amounts of hydrogen peroxide were added where indicated. The reaction was carried out at a temperature of 100° C. for a period of about 4½ hours.

The specific reaction conditions, order of addition for reagents, and order of taking of redox potential and pH measurements is set forth in Table XII below.

*Variation in the catalyst systems employed*

In the foregoing examples, considerable emphasis has been placed upon the depositing of the metal ion by ion exchange reaction in fibers or pulp followed by the formation of a complex of metal ion with hydrazine or ammonia. This reducing complex is used in cooperation with hydrogen peroxide as a redox catalyst system for initiating polymerization within/and upon the pulp or fiber in which the catalyst is located. It should be clearly understood, however, that the catalyst systems which can be used in this invention are by no means limited to those described in the foregoing examples. The basic inventive concept of this process contemplates the use of a catalyst component which is chemically fixed within a host material by formation of a coordination complex with another material which has been introduced into the host by ion exchange reaction. The material which is introduced by ion exchange reaction is usually non-catalytic but is not necessarily so. Where the ion exchanged material is catalytic, the material which is complexed with it cooperates synergistically to increase the catalytic effect, as for instance, by enlarging the active area around the original ion-exchange site. While the material which has been introduced by ion exchange is non-catalytic, it functions primarily to localize and fix the catalyst which is complexed therewith. In the foregoing examples, the reductant was complexed with a metal ion which has previously been introduced into the host material by ion reaction. I have found that the oxidant, viz. hydrogen peroxide, organic peroxides, persulfates, etc., can be complexed with an ion which has been introduced by ion exchange reaction into the host and the treated material subsequently and mixed with the monomer and reductant to initiate polymerization within the host material. Also, it should be noted that while the process is primarily concerned with the use of a redox catalyst system, it can be used for other type of catalytic polymerization. Any suitable catalyst can be chemically fixed by formation of a complex with a material previously introduced by ion exchange

TABLE XII.—DEPOSITION OF POLY (LAURYLMETHACRYLATE) INTO PULP

| Example No | 81 | 82 | 83 | 84 | 85 | 86 |
|---|---|---|---|---|---|---|
| | 10 g. pulp | | | | | |
| Exchange Ion | Fe+++ | Fe+++ | Al | Al | Ni | Ni |
| 0.35% NH$_4$OH, ml | | 5 | | 5 | | 5 |
| 0.5 N H$_2$SO$_4$, ml | 0.3 | 0.3 | 0.3 | 0.3 | 0.3 | 0.3 |
| 0.5% Hydrazine hydrate, ml | 10 | | 10 | | 10 | |
| Redox: | | | | | | |
| Mv | 15 | 10 | 15 | 25 | 40 | 115 |
| pH | 7.0 | 7.7 | 7.5 | 7.9 | 7.5 | 8.0 |
| Monomer, g | 10 | 10 | 10 | 10 | 10 | 10 |
| Redox: | | | | | | |
| Mv | 20 | 40 | 10 | 20 | 20 | 25 |
| pH | 7.2 | 7.8 | 7.4 | 8.0 | 7.6 | 8.0 |
| 0.35% H$_2$O$_2$, ml | 10 | 10 | 10 | 10 | 10 | 10 |
| Redox: | | | | | | |
| Mv | 110 | 180 | 140 | 180 | 75 | 130 |
| pH | 7.4 | 8.0 | 7.4 | 8.0 | 7.5 | 8.0 |
| 0.35% H$_2$O$_2$, ml | 15 | 5 | 10 | 5 | 15 | 10 |
| Redox: | | | | | | |
| Mv | 230 | 185 | 135 | 180 | 215 | 210 |
| pH | 6.4 | 7.6 | 7.0 | 7.8 | 6.7 | 7.5 |
| Temp., °C | 100 | 100 | 100 | 100 | 100 | 100 |
| React. Time (hr.: min.) | 4:30 | 4:30 | 4:30 | 4:30 | 4:30 | 4:30 |
| Final Redox: | | | | | | |
| Mv | 170 | 150 | 300 | 270 | 260 | 270 |
| pH | 5.4 | 6.9 | 5.5 | 5.0 | 5.4 | 5.9 |
| Percent polymer addon | 2.6 | 5.0 | 8.2 | 19.0 | 11.7 | 10.2 |

In the above table, the order of addition of reagents and the taking of redox potential and pH measurements is noted by reading down each column of the appropriate example heading. At the end of each experiment, the slurry was dewatered and the pulp washed and dried and yield measurements taken. The best yields were obtained using pulp which had been ion exchanged with aluminum or nickel ion and complexed with hydrazine or ammonia as the reducing catalyst component. Under the most favorable reaction conditions, yields of the order of 8 to 19% were obtained.

reaction into the host material. For example, hydrogen peroxide or other oxidants can be complexed with ions introduced into the host by ion exchange reaction and used as initiators for formal polymerization processes which do not function on the redox principle.

EXAMPLE 87

A slurry of 1500 g. (bone-dry weight) of Crofton wood pulp in 80 liters of distilled water was treated with 5.0 g. of Al$_2$(SO$_4$)$_3$·18H$_2$O to introduce aluminum ions by ion exchange reaction. The slurry was heated to 75° C. and deaerated for 65 min. Sufficient $H_2O_2$ (26 mmol.) was then added to produce a redox potential of +225 mv. and pH of 6.45 in the slurry. A period of 15 minutes was allowed for formation of the catalyst complex.

Next, 500 g. methyl methacrylate monomer were added and dispersed in the slurry. At this point, the redox potential was +160 mv. and pH was 7.15.

Sufficient hydrazine hydrate (20 ml. of 3.5% solution) was then added to produce a redox potential of −15 mv. and pH of 7.20 in the slurry. The mixture was held at 98° C. for 130 min. following addition of hydrazine.

At the end of the reaction period, the redox potential was −25 mv. and pH was 7.20. The slurry was dewatered, washed, and dried. The yield of polymer-deposited pulp, corrected for moisture content, was 1844 g. There was a monomer conversion of 69%. Polymer addon was 23%.

EXAMPLE 88

A slurry of 1500 g. (bone-dry weight) of Crofton wood pulp in 80 liters of distilled water was treated with 5.0 g. of $Al_2(SO_4)_3 \cdot 18H_2O$ to introduce aluminum ions by ion exchange reaction. The slurry was heated to 57° C. and deaerated for 40 min. Sufficient $H_2O_2$ (25 ml. of 3.5% solution) was added to produce a redox potential of +200 mv. and pH of 7.2. After thirty minutes, 10 ml. of 0.5 N $H_2SO_4$ were added to adjust the pH to 5.2 and redox potential to +210 mv.

Next, 500 g. of styrene were added, together with an additional 10 ml. of 0.5 N $H_2SO_4$. The redox potential was +250 mv. and pH was 4.3. Then, sufficient hydrazine (two additions of 20 ml. 3.5% hydrazine hydrate) was added to produce a redox potential of −75 mv. and pH of 7.2. The mixture was held at 95° C. for 95 min. following addition of hydrazine.

At the end of the reaction period, the redox potential was +85 mv. and pH was 7.3. The product was dewatered, washed and dried. The yield of polymer-deposited pulp, corrected for moisture content, was 1935 g. There was a monomer conversion of 87%. Polymer addon was 28%. The final redox potential shows that hydrazine was not exhausted at the time the reaction was stopped.

*Application of this process to continuous polymer deposition*

As noted in the introduction of this specification, this process is concerned with the deposition of polymers into various host materials using complexed catalyst and is also concerned with the continuous deposition of polymers into fibers, pulps and other polymeric host materials having a form suitable for continuous processing. The operation of a continuous polymer deposition process for fibers or pulp can best be understood by reference to the flow diagram shown in the attached drawings.

In the accompanying flow diagram, there is diagrammatically illustrated the sequence of steps and apparatus used in the continuous processing of pulps or fibers for continuous deposition of polymers therein. The fibers or pulp are first put through a washing operation in hot water to break up and disperse the fibers and to remove any residues from the bleaching process or any foreign materials such as waxes or polysaccharides which might inhibit ion exchange. From the washer, the fibers or pulp are passed to a separator which may be a continuous filter or a continuous centrifuge where the water is removed and the fibers are recovered in a form suitable for processing. The fibers or pulp are then passed into a suitable mixing tank where they are formed into a dilute slurry, e.g. a 2% slurry in distilled or deionized water, and a small amount of a salt is added for introduction into the fibers or pulp by ion exchange reaction. If the salt is of a metal in a reduced valence state, it must be added under anaerobic conditions subsequent to a thorough deaeration of the slurry. The salt is preferably added in an amount equi(molar) with the ion exchange capacity of the fibers or pulp being treated.

At this point at least two alternate procedures are contemplated. The ion exchanged pulp or fibers can be continuously processed on through the reaction system as shown in the flow diagram, or the fibers can be diverted to a separator where they are dewatered and deaerated and placed in storage awaiting further processing. The separation and storage of the fibers is shown by dotted flow lines in the flow diagram as an alternate procedure. If the fibers or pulp have been separated and stored, they are subsequently remixed with water in a mixer to form a dilute slurry for further processing. If the fibers are not separated and stored as shown in the alternate procedure, then the slurry must be deaerated before further chemical processing takes place. After deaeration of the slurry, the catalyst reductant is added to form a coordination complex with the ion introduced by ion exchange into the fibers or pulp. At this time, a small amount of acid or base is added to adjust the pH of the reaction mixture to the desired level for processing of the particular monomer being polymerized. At this time, the monomer is introduced into the slurry and thoroughly mixed therewith.

The slurry, containing fibers or pulp, reductant, and monomer are continuously fed, as shown by the flow line, to a system of reactor tubes for further processing. As the slurry is pumped to the reactor tubes, hydrogen peroxide or other oxidant is introduced for initiating polymerization. The slurry is shown as being pumped by a reciprocating slurry pump, preferably having a reciprocating plunger which will move the reaction mixture without causing the fibers or pulp to become entangled in the pump.

The reactor tubes preferably consist of a plurality of "U" tubes arranged in a suitable heat exchange medium for maintaining the separate portions of the reaction system at desired temperature levels. The slurry is usually maintained at a temperature of about 70° C. at the mixer and is heated to about 80° C. in the first leg of the reactor. The reaction mixture is further heated to a temperature of about 90–100° C. toward the end of the reaction system. Of course, other suitable reaction temperatures would be selected according to the requirements of the reaction being carried out. The reactor tubes are shown as being provided with a system of spiral baffles which causes the slurry to be continually agitated and thus maintain the fibers or pulp in suspension.

At the outlet from the mixer, there is shown diagrammatically a measuring device for determining redox potential and pH of the reaction mixture. Similar devices are shown at various intervals throughout the length of the reactor system. The redox potential and pH measurements are made at selected intervals in the process and adjustments in flow rates of reactants and addition of reagents is carried out at various points in the reactor system to maintain the redox potential and pH at preselected levels.

The reaction slurry is continuously pumped through the reactor system, as described above, and is discharged to a separator where the fibers or pulp is dewatered and unreacted monomer is recycled as indicated. The polymer modified fibers or pulp product is then passed to a washer where soluble impurities, catalyst, and unused monomer are removed. The product is then passed to a dryer and finally to storage. This process has been found to be effective for the continuous processing of fibers, pulp, or films and gives controllable and reproducible yields of polymer modified product. While the general procedure has been described with primary emphasis on the treatment of fibers or pulp, it should be understood that the procedure is equally applicable to the continuous deposition of polymer into any host material having a form suitable for continuous processing.

The following non-limiting examples are illustrative of the application of this continuous process to the production of particular products.

EXAMPLE 89

This example demonstrates the application of this process to the continuous deposition of polymethylmethacrylate into cotton linters at a feed rate of about one kilogram per hour of cotton.

Several kilograms of cotton linters are washed in the washer unit of the process as shown in the accompanying flow diagram. The washing process is effective to break up clumps and disperse the fibers and remove any residues from the bleaching process. The washed fibers are passed to a centrifugal separator where the water is removed. The washed fibers are then mixed with sufficient distilled or deionized water to form a 2% slurry and aluminum sulfate, in dilute solution, is added in an amount corresponding to four millimoles per kilogram of dry cotton treated. The slurry is thoroughly mixed so that the aluminum salt is fully dispersed to facilitate ion exchange reaction at the carboxyl groups in the cellulose. During this agitation of the slurry, the system is thoroughly deaerated.

Next, a dilute hydrazine solution is added, at a rate of 7.5 millimoles of hydrazine (as hydrazine hydrate) per kilogram of dry cotton treated, to the slurry and thoroughly mixed therewith. Monomer is continuously added in a ratio of 320 g. of methyl methacrylate per kilogram of dry cotton treated.

The reaction mixture just prepared is pumped from the mixer into the reactor tubes as shown in the flow diagram at a flow rate of one kilogram per hour, of contained cellulose. At the outlet from the mixer, measurements are taken of the redox potential and pH of the reaction system. At this point, the mixture has a redox potential of +40 millivolts and a pH of 6.25. At a point intermediate the mixer and the inlet to the reactor tubes, hydrogen peroxide is introduced continuously in the form of a 0.35% solution at a flow rate of 60 ml. per kilogram of dry cellulose. At this point, the slurry is maintained at a temperature of about 70° C. As the slurry is pumped through the reactor tubes, the temperature is increased to and held at about 99° C.

The slurry is flowed continuously into the reactor tubes using the reciprocating pump as shown in the flow diagram at a flow rate of one kilogram per hour of contained cellulose. The reactor tubes are sized for a residence time of about five hours.

After addition of hydrogen peroxide, the redox potential and pH of the reaction mixture are measured. The slurry is found to have a redox potential of +100 millivolts and a pH of 6.0. If there is an appreciable deviation from either the desired redox potential or pH, the composition of the reaction mixutre is adjusted by readjusting the initial input of hydrogen peroxide, hydrazine or buffers for adjustment of redox potential or pH of the slurry.

Similar measurements of the redox potential and pH are made at successive stages in the reactor and suitable adjustments made in the slurry composition. At the exit end of the reactor tubes, a final measurement of redox potential and pH is made. At this point, the slurry has a redox potential of 220 millivolts and a pH of 5.1. This measurement determines the degree of exhaustion of the catalyst system. In operating this process, the control of the quality and yield of the final product is dependent to a large extent on maintaining a close control of the redox potential and pH at the several points in the reaction system as dictated by previous operating experience.

As the slurry is discharged from the end of the reactor tube, it is passed into a separator where the water and unreacted monomer are removed and recycled. The polymer-modified fibers are passed into a washer where the fibers are washed with hot water. The washed fibers are then passed through a dryer where they are subjected to circulating air maintained at about 70° C. Alternatively, the washed fibers may be mixed with a suitable plastic matrix or otherwise processed in accordance with the desired end use.

After drying, the product is found to consist of cotton fibers containing polymethylmethacrylate deposited within/and upon the fibers in a yield of 1235 g. (bone-dry cotton plus polymer addon) per kilogram of dry cotton fed to the process.

EXAMPLE 90

In this example, polymethylmethacrylate is continuously deposited into bleached kraft wood pulp at a pulp feed rate of about one kilogram per hour.

Several kilograms of bleached kraft wood pulp are processed in the washer as indicated at the beginning of the flow diagram. In the washing operation, the pulp is broken up and clumps are separated. The washing operation also serves to remove impurities from the pulp which might interfere with the process. Next, the pulp is passed into a centrifugal separator where water and soluble impurities are removed.

The washed separated pulp is then diluted to form a 2% slurry in deionized water and mixed with a dilute nickel-containing solution in a ratio of 5.26 g. nickel sulfate hexahydrate per kilogram of dry pulp. This treatment is effective to introduce nickel ion into the pulp by ion exchange reaction.

The pulp is then passed into a centrifugal separator and deaerated and stored. From storage, the pulp is introduced into the mixer where it is reslurried to a 2% concentration.

Next, dilute hydrazine, dilute sulfuric acid and monomer are added, at a rate of 250 ml. of 0.5 N sulfuric acid and 1000 ml. of 0.5% hydrazine hydrate and 500 g. of methyl methacrylate monomer per kilogram of dry pulp treated.

After addition of hydrazine, acid, and monomer, the redox potential and pH of the slurry are determined for controlling the course of the reaction. At this point, the slurry has a redox potential of −75 millivolts and a pH of 7.3. Sufficient additional acid is then added to the slurry to adjust the system to a pH more suitable for polymerization of methyl methyacrylate. After addition of the acid, the slurry has a redox potential of +60 millivolts and a pH of 5.8.

After addition of sulfuric acid and prior to introduction of the slurry into the reactor tubes, hydrogen peroxide is continuously introduced into the slurry in a form of a 0.35% solution at a flow rate of 1000 ml. per kilogram of dry pulp contained in the slurry. After introduction of the hydrogen peroxide, the temperature of the slurry is gradually increased from a value of about 70° C. to the operating reaction temperature of 100° C. After addition of hydrogen peroxide, the redox potential and pH are again measured. At this point, the slurry has a redox potential of +190 millivolts and a pH of 5.4. Dilute aqueous ammonia is continuously added at a rate of 200 ml. of 0.35% ammonium hydroxide per kilogram of dry pulp in the slurry to adjust the pH to 6.1 and redox potential to +95 millivolts.

The slurry is pumped through the reactor tubes using a reciprocating slurry pump as indicated in the flow diagram. The spiral baffles in the tubes function to agitate the slurry and prevent settling out of the pulp. The redox potential and pH measurements are taken at successive points in the reactor tubes and suitable adjustments in the input rates of reagents where necessary to control the reaction conditions (as indicated by the measurements).

The slurry is pumped through the reactor tubes and at a flow rate of one kilogram per hour of dry pulp in the slurry, with a residence time reactor of approximately five hours. At the outlet end of the reactor tubes, the slurry has a redox potential of +200 millivolts and a pH of 3.9.

The redox potential and pH measurements are made at the several points in the process to establish necessary levels (as dictated by previous operating experience)

which must be maintained substantially constant at the indicated points to obtain high quality and high yield of product. The control of pH and redox potential values (by control of input flow rates of various reagents) at constant preselected levels is effective to insure that reproducible, predetermined yields of product will be obtained.

The slurry which is discharged from the end of the reactor tubes is passed into the separator where water and unreacted monomer are removed and recycled. The polymer-modified fibers are then washed and dried as indicated in the flow diagram.

The product which is obtained is a wood pulp containing 437 g. polymethylmethacrylate deposited within/and upon the pulp fibers per kilogram of dry pulp treated in the process.

EXAMPLE 91

In this example, polystyrene is continuously deposited into cotton linters at a flow rate of one kilogram per hour of dry cotton.

Several kilograms of cotton linters are washed in the initial step as indicated in the flow diagram to break up clumps and remove impurities as well as residues from the bleaching process. The washed cotton is then dewatered in the separator.

Next, the washed and separated cotton linters are diluted with deionized or distilled water to form a 3% slurry. To this slurry there is added a dilute cadmium sulfate solution containing four millimoles of cadmium sulfate per kilogram of dry cotton. This treatment is effective to introduce cadmium ions into the cotton by ion exchange with the carboxyl groups in the cellulose. The treated cotton fibers are then passed into a separator where water and air are removed.

From the separator, the fibers are passed to storage and subsequently back to a mixer unit for reslurrying and introduction into the continuous process equipments. The fibers, reslurried at a 3% concentration and after preliminary treatment, are pumped through the system at a feed rate of one kilogram per hour of dry cotton in the slurry. There is a five hour residence time for the reaction mixture in the reactor tubes.

The cadmium-treated fibers are mixed with acid, hydrazine, and monomer at a rate of 12 milliequivalents of sulfuric acid, 10 millimoles of hydrazine hydrate, and 210 grams of styrene monomer per kilogram of dry cotton in the slurry. The treated cotton fibers, monomer, reductant, and acid are thoroughly mixed and pumped through the flow line to the reactor tubes as indicated in the flow diagram.

At the outlet from the mixer, measurements are made of the redox potential and pH of the slurry. The slurry is found to have a redox potential of +115 millivolts and a pH of 4.6. These redox potential and pH levels are maintained by suitable adjustment of reagent flow rates.

In the line from the mixer to the slurry pump, dilute hydrogen peroxide is continuously added in at a ratio of 18 millimoles per kilogram of dry cellulose in the slurry. One additional acid is added for buffer adjustment. The reaction mixture is pumped through the reactor tubes by the reciprocating slurry pump and kept agitated by the baffles in the reactor tubes to prevent settling out of the slurry. After addition of hydrogen peroxide, the redox potential and pH measurements are again taken. At this point, the slurry has a redox potential of +175 millivolts and a pH of 4.4. The slurry is maintained at a temperature of about 100° C. throughout the period of residence in the reactor tubes.

Additional measurements of redox potential and pH are made at various points in the reactor system as shown in the flow diagram. Adjustments of reductant, oxidant, acid, or base flow rates are made, as indicated, to adjust the redox potential and pH to a preselected constant level for the particular point in the reactor. At the discharge end of the reactor tubes, the slurry has a redox potential of +160 millivolt and a pH of 4.2.

At the end of the reactor tubes, the slurry is passed into a separator where it is dewatered and the unreacted monomer recycled. From the separator, the polymer treated pulp is passed into a washer where soluble impurities, catalyst, and monomer residue are removed and then to a dryer where it is subjected to circulation of hot air at a temperature of about 70° C.

In this process, there is a continuous product yield of 1200 g. (cotton plus deposited polystyrene) per kilogram of dry cotton fed to the reaction system. There is a polymer addon of 20% in the cotton fibers. The monomer conversion, under these reaction conditions, is about 95%.

EXAMPLE 92

In this example, polystyrene is continuously deposited into bleached kraft wood pulp at a flow rate of approximately one kilogram per hour of dry pulp.

Several kilograms of dry bleached kraft wood pulp are washed to break up clumps and remove impurities as indicated in the flow diagram. The washed pulp is then passed into the separator where water is removed.

The washed, separated pulp is then reslurried to a 2% concentration and treated with a dilute solution of 5.26 g. nickel sulfate hexahydrate per kilogram of dry pulp. This treatment is effective to introduce nickel ion into the pulp by ion exchange reaction with the carboxyl groups in the cellulose. During this treatment, the slurry is completely deaerated.

There is then added continuously to the nickel-treated pulp acid, monomer and hydrazine in the ratio of 200 ml of 0.5 N sulfuric acid, 500 g. of styrene monomer, and 1000 ml. of 0.5% hydrazine hydrate per kilogram of dry pulp in the slurry. The several reagents are thoroughly mixed and sufficient time allowed for formation of the hydrazine-nickel complex.

The slurry is pumped into the reactor tubes by the slurry pump as shown in the flow diagram. After addition of acid, monomer, and hydrazine, the slurry has a redox potential of −120 millivolts and a pH of 7.6. The acid flow rate is then increased to adjust the redox potential to +140 millivolts and the pH to 4.7.

In the line from the mixer to the slurry pump, hydrogen peroxide is continuously added in the form of a 0.35% solution at a flow ratio of 1000 ml. per kilogram of dry pulp in the slurry. The slurry is pumped through the system of reactor tubes at a flow rate of one kilogram per hour of dry pulp, allowing a residence time of four hours in the reactor tubes.

After addition of hydrogen peroxide, the redox potential and pH are again measured. At this point, the slurry has a redox potential of +215 millivolts and a pH of 5.2. Since the pH of the system is slightly high, additional acid is added. The slurry is maintained at a temperature of 100° C. throughout the entire reaction period.

At the discharge end of the reactor tubes, the slurry has a redox potential of +265 millivolts and a pH of 3.5. It should be noted that the redox potential and pH measurements taken at various intervals in the reactor are used for purposes of controlling the reaction and thus obtaining a uniform product of high quality and predictable yield. By maintaining the pH and redox potentials at preselected constant values (by adjustment of feed rates of acid, peroxide, hydrazine, etc.) for the various points in the reactor system, it is possible to predetermine the yield and quality of polymer modified product.

From the discharge end of the reactor tubes, the slurry is passed into a separator where it is dewatered and unreacted monomer is recycled. The polymer modified pulp is then passed through a continuous washer and a continuous dryer and finally to product storage. In this run, there is produced a continuous yield of 1312 g. of polymer-deposited pulp per kilogram of dry pulp fed into the reaction system. Under the specified reaction conditions, the dry product yield is 1312 g. per hour. The product consists of a dry pulp having 31.2% addon of polystyrene deposited within and upon the fibers.

While the several examples just given of continuous deposition polymers into polymeric host materials are limited to the deposition of polymethylmethacrylate or polystyrene into cotton linters or bleached kraft pulp, it should be understood that the principles disclosed relating to the continuous control of polymer deposition are applicable to the continuous processing of any host material having a form suitable for continuous operation. The data set forth in the batch experiments described in Examples 1 to 88 are applicable to a continuous process. Any of the experiments reported in those examples can be carried out in the continuous reactor described and shown in the flow diagram. The various treatment steps are followed and reagents continuously added as described in the general description of the continuous process. The redox potential and the pH control measurements are made at the points generally indicated in the flow diagram and correspond approximately to the measurements reported in the tables setting forth a specific reaction condition for the various examples.

The process is also applicable to the continuous processing of other materials having a form suitable for continuous processing. Thus, a fibrous material such as asbestos or a particulate material such as a bentonite clay can be processed and modified by deposition of any suitable polymer in a continuous manner according to the steps outlined in this process.

When ground wood or wood flour, having a substantial content of hemicellulose or low D.P. celluloses, is treated in accordance with this process, there is a multiplication of the polymer deposition effect. These materials have more carboxyl groups which can function as sites for catalyst anchoring and initiation of polymerization. Deposition of polyacrylonitrile into ground wood produces polymer-modified products with polymer molecules stemming from a number of sites, thus yielding a polyfunctional material useful as a cross-linking agent.

A material in a sheet or tubular form such as paper, cellophane, or tubular cellulose sausage casings can be continuously treated in accordance with this process. Such a material would be fed continuously through various treatment and reaction baths rather than a tubular reactor and the various reagents added in controlled continuous flow at the points indicated in the flow diagram. The pH and redox potential measurements are made at substantially the same points in the system and suitable adjustments in flow rates of reagents are made to adjust the redox potential and pH values to preselected constant levels.

While I have described my invention with special emphasis upon several preferred embodiments, I wish it to be understood that within the scope of the appended claims, this invention may be practiced otherwise than as specifically described herein.

What is claimed is:

1. A method of treating a host polymeric material of at least gelatinous solidity having ion exchange capacity resulting from ion exchange groups therein which comprises: chemically fixing a first material within a host material by ion exchange reaction, treating the ion exchange-treated host material with a second material capable of forming a coordination complex with said first material under conditions operable to produce said coordination complex, said second material being adapted to provide at least part of a catalyst for effecting polymerization of an olefinically unsaturated monomer, and treating said host material and chemically fixed first material coordination complex in any order with said olefinic monomer and anything additional required to render second material catalytically active, to polymerize said monomer and deposit the resulting guest polymer within said host material.

2. A method as defined in claim 1 in which said second material constitutes one component, but less than all, of a multiple component catalyst system.

3. A method as defined in claim 2 in which the multiple component catalyst system is a free radical producing catalyst system.

4. A method as defined in claim 3 in which said catalyst system is a redox catalyst system.

5. A method as defined in claim 4, in which the host material is treated continuously in a reactor and the product continuously withdrawn therefrom.

6. A method as defined in claim 1 in which said first material is added at preselected zones in said host material.

7. A method as defined in claim 1 in which said olefinically unsaturated monomer is a vinyl monomer, vinylidene monomer, acrylic ester, or methacrylic ester.

8. A method as defined in claim 5 in which the host material comprises a film.

9. A method as defined in claim 5 in which the host material comprises cellulosic fibers.

10. A method as defined in claim 5 in which measurements are made of redox potential and pH at successive stages in the reactor and said redox potential and pH are controlled at preselected values, thereby to control yield and uniformity of product withdrawn from the reactor.

11. A method as defined in claim 5 in which said first material is a cation derived from a salt of a metal selected from the group consisting of polyvalent metals and metals of group 1B of the periodic table.

12. A method as defined in claim 5 in which the redox catalyst system comprises hydrazine and hydrogen peroxide.

13. A method as defined in claim 5 in which the redox catalyst system comprises ammonia and hydrogen peroxide.

14. A method of depositing a polymer of an olefinic monomer within a host polymeric material of at least a gelatinous solidity which comprises: contacting a salt compound of said host material, said salt compound comprising said host material and an ion introduced by ion exchange reaction, with a first material capable of forming a coordination complex with the bound ion in said host material under conditions operable to produce the complex, said first material being adapted to provide at least part of a catalyst for effecting polymerization of an olefinically unsaturated monomer, and treating said host material and coordinated first material, in any order, with said olefinically unsaturated monomer and anything additional required to render said first material catalytically active, to polymerize said monomer and deposit the resulting guest polymer within said host material.

15. A method as defined in claim 14 in which said coordinated first material comprises at least one component of a redox catalyst system.

16. A method of depositing a polymer of an olefinically unsaturated monomer within cellulosic fibers which comprises: treating said fibers with a solution of a salt of a metal selected from the group consisting of polyvalent metals and metals of group 1B of periodic table to introduce the metal ion by ion exchange reaction with ion sites in the fibers, treating the ion exchanged fibers with one component of a redox catalyst system capable of forming a coordination complex with said metal ion under conditions operable to produce said complex, and to treating the fibers in any order with said olefinically unsaturated monomer and the remaining component of said redox catalyst system, thereby to polymerize said monomer and deposit the resulting guest polymer within said fibers.

17. A method as defined in claim 16 in which the host material is treated continuously in a reactor and the product continuously withdrawn therefrom.

18. A method as defined in claim 16 in which measurements are made of redox potential and pH at successive stages in the reactor, and said redox potential and pH are maintained at preselected values, thereby to control the yield and uniformity of product withdrawn from the reactor.

19. A method as defined in claim 18 in which the host material comprises cellulosic fibers or pulp.

20. A polymeric material of at least gelatinous solidity containing ions of metals selected from the group consisting of polyvalent metals and metals of group 1B of the periodic table, introduced by ion exchange reaction with ion exchange sites therein, and a material bound to said ions as a coordination complex which is adapted to constitute at least one component of a redox catalyst system.

References Cited
UNITED STATES PATENTS
3,083,118   3/1963   Bridgeford _____ 117—47

ALFRED L. LEAVITT, Primary Examiner.
A. H. ROSENSTEIN, Assistant Examiner.

UNITED STATES PATENT OFFICE
CERTIFICATE OF CORRECTION

Patent No. 3,330,686　　　　　　　　　　Dated July 11, 1967

Inventor(s)　Henry J. Rose

It is certified that error appears in the above-identified patent and that said Letters Patent are hereby corrected as shown below:

Column 4, line 34, before "condensation " insert -- other --. Column 5, line 30, "and" should read -- any --. Column 6, line 31, "reactions" should read -- reaction --; line 53, "so-caled" should read -- so-called --. Column 9, line 8, "complexion" should read -- complexing --. Column 10, line 16, "deca" should read -- decyl --. Columns 27 and 28, Table III, under example 34, second line of column "1" should read -- 10 · Columns 29 and 30, Table IV, example 42, fourteenth line of example, "51" should read -- 15 --. Column 31, line 62, "hose" should read -- host --. Column 48, line 73, "16" should read -- 17 --.

Signed and sealed this 7th day of September 1971.

(SEAL)
Attest:

EDWARD M.FLETCHER,JR.　　　　　　ROBERT GOTTSCHALK
Attesting Officer　　　　　　　　　Acting Commissioner of Paten